(12) United States Patent
Radichel et al.

(10) Patent No.: US 12,700,720 B2
(45) Date of Patent: Aug. 4, 2026

(54) TRANSMISSION LINE ADVANCEMENT SYSTEM WITH TRANSMISSION LINE SPEED ADJUSTMENT

(71) Applicant: Condux International, Inc., Mankato, MN (US)

(72) Inventors: Bradley Paul Radichel, Key Largo, FL (US); Heinz U. Wortmann, Lino Lakes, MN (US); David J. Hassing, Mankato, MN (US)

(73) Assignee: Condux International, Inc., Mankato, MN (US)

( * ) Notice: Subject to any disclaimer, the term of this patent is extended or adjusted under 35 U.S.C. 154(b) by 215 days.

(21) Appl. No.: 18/611,574

(22) Filed: Mar. 20, 2024

(65) Prior Publication Data

US 2024/0322535 A1 Sep. 26, 2024

Related U.S. Application Data

(60) Provisional application No. 63/491,111, filed on Mar. 20, 2023.

(51) Int. Cl.
H02G 1/08 (2006.01)
H02G 1/02 (2006.01)

(52) U.S. Cl.
CPC .............. H02G 1/086 (2013.01); H02G 1/02 (2013.01)

(58) Field of Classification Search
CPC ........ H02G 1/086; H02G 1/1088; G02B 6/52; G01V 1/002
See application file for complete search history.

(56) References Cited

U.S. PATENT DOCUMENTS

| | | | | |
|---|---|---|---|---|
| 5,815,908 A | * | 10/1998 | Wichmann | ........... G02B 6/4488 |
| | | | | 219/121.64 |
| 5,884,384 A | * | 3/1999 | Griffioen | ............. F16L 55/1657 |
| | | | | 226/97.1 |
| 11,025,039 B2 | * | 6/2021 | Radichel | ................... G02B 6/52 |
| 11,255,479 B2 | * | 2/2022 | Radichel | ................ F16L 55/48 |
| 12,237,654 B2 | * | 2/2025 | Radichel | ............. G01V 11/002 |
| 12,272,934 B2 | * | 4/2025 | Radichel | ................... H02G 9/06 |
| 2006/0147163 A1 | * | 7/2006 | Mayhew | ................... G02B 6/52 |
| | | | | 385/100 |
| 2019/0341752 A1 | * | 11/2019 | Radichel | ................ H02G 1/086 |
| 2021/0313783 A1 | * | 10/2021 | Radichel | ............. G01V 11/002 |

(Continued)

FOREIGN PATENT DOCUMENTS

| | | |
|---|---|---|
| WO | 2022170120 A1 | 8/2022 |
| WO | 2023250462 A1 | 12/2023 |

*Primary Examiner* — Lee D Wilson
(74) *Attorney, Agent, or Firm* — Merchant & Gould P.C.

(57) ABSTRACT

The present disclosure relates to the installation of transmission lines with a transmission line advancement system. The transmission line advancement system is configured to install a variety of transmission lines into a conduit, pipe, duct, or the like, including fiber optic cables and electrical transmission lines. Furthermore, the present disclosure generally relates to a transmission line speed adjustment system for synchronizing a first location speed and a second location speed, a method for synchronizing a transmission line first location speed with a transmission line second location speed, and another transmission line speed adjustment system for synchronizing a first location speed and a second location speed.

20 Claims, 21 Drawing Sheets

TRANSMISSION LINE
INSTALLATION SYSTEM 100

(56) References Cited

U.S. PATENT DOCUMENTS

| 2022/0393444 | A1* | 12/2022 | Radichel | ................ | H02G 1/086 |
| 2024/0297485 | A1* | 9/2024 | Johnson | ................ | H02G 1/086 |
| 2024/0322532 | A1* | 9/2024 | Radichel | ................ | B65H 49/18 |
| 2024/0322533 | A1* | 9/2024 | Radichel | ................ | G02B 6/52 |
| 2024/0322535 | A1* | 9/2024 | Radichel | ................ | H02G 1/086 |
| 2025/0323476 | A1* | 10/2025 | Radichel | ................ | H02G 1/085 |

* cited by examiner

FIG. 9

KEY

Optimal Position Tolerance 217
Cautionary Zone 218
Adjustment Zone 219

X Direction

340

```
┌─────────────────────────────────────────────┐
│              LOCAL CONTROLLER                 │
│                     160                       │
│                                    360        │
│           ┌─────────────────────────┐         │
│           │                         │         │
│           │   PROCESSING DEVICE     │         │
│           │                         │         │
│           └─────────────────────────┘         │
│                                    362        │
│           ┌─────────────────────────┐         │
│           │                         │         │
│           │     MEMORY DEVICE       │         │
│           │                         │         │
│           └─────────────────────────┘         │
│                                    364        │
│           ┌─────────────────────────┐         │
│           │     COMMUNICATION       │         │
│           │        DEVICE           │         │
│           └─────────────────────────┘         │
│                                    366        │
│           ┌─────────────────────────┐         │
│           │    INTRACOMPONENT       │         │
│           │    INPUT/OUTPUT         │         │
│           │    COMMUNICATAION       │         │
│           │        DEVICE           │         │
│           └─────────────────────────┘         │
│                                               │
└─────────────────────────────────────────────┘
```

Advancing a transmission line from a first location at a first location speed toward a second location — 472

Advancing the transmission line to a speed measurement device at the second location — 474

Measuring the transmission line speed at the second location relative to the first location — 476

Synchronizing the second location speed with the first location speed — 478

TRANSMISSION LINE ADVANCEMENT SYSTEM WITH TRANSMISSION LINE SPEED ADJUSTMENT

CROSS-REFERENCE TO RELATED APPLICATION(S)

This application claims priority to U.S. Provisional Patent Application No. 63/491,111, filed on Mar. 20, 2023, the disclosure of which is hereby incorporated by reference in its entirety.

BACKGROUND

Transmission lines are used for transmitting power or data signals. One type of transmission line is a fiber optic cable that can be used to transmit digital data using light signals. The use of fiber optic cable for data transmission is popular, at least in part due to the high data transmission rate and very fast transmission speed. Another type of transmission line is an electrical transmission line. Electrical transmission lines carry electrical current from one point to another in an electric power system.

Transmission lines can be used to carry power or data signals short distances, such as within a building, or long distances, such as between neighboring cities. For longer distance communication, cables may be installed in underground ducts, where continuous cables are desired between manhole, hand hole, or other access point locations. The underground ducts often change direction along a transmission path.

Installation equipment such as line blowers and pullers have been developed that can be used to insert fiber optic cable into ducts over long distances. It is desirable to have transmission line installation equipment which can facilitate smooth and stable advancement of a variety of transmission lines that are being installed. Furthermore, it is desirable to have installation equipment that can accommodate changes in the direction of a duct along a transmission path. Further yet, it is desirable to synchronize various characteristics of the installation equipment to install transmission lines safely and effectively.

SUMMARY

The present disclosure relates to the installation of transmission lines with a transmission line advancement system. The transmission line advancement system is configured to install a variety of transmission lines into a conduit, pipe, duct, or the like, including fiber optic cables and electrical transmission lines. Various aspects are described in this disclosure, which include, but are not limited to, the following aspects.

Furthermore, an example of the present disclosure relates to a transmission line speed adjustment system for synchronizing a first location speed and a second location speed. The transmission line speed adjustment system includes a conduit configured to receive a transmission line from a first location at the first location speed and guide the transmission line to a speed measurement device coupled to the conduit. The transmission line speed adjustment system also includes an advancement device configured to receive the transmission line from the speed measurement device and apply an advancement force to the transmission line to advance the transmission line at the second location speed. The transmission line speed adjustment system further includes that the speed measurement device configured to slide relative to the advancement device when the first location speed is not equal to the second location speed. The transmission line speed adjustment system further yet includes a speed measurement device sensor configured to indicate a position of the speed measurement device and a corresponding speed of the transmission line at a second location relative to the first location.

Further yet, another example of the present disclosure relates to a method for synchronizing a transmission line first location speed with a transmission line second location speed including using a conduit, receiving a transmission line from a first location and guiding the transmission line at the first location speed to a speed measurement device. The method also including using the speed measurement device, receiving the transmission line from the conduit at a speed measurement device first end and guiding the transmission line to an advancement device coupled to a speed measurement second end. The speed measurement device is configured to measure a first location force at the speed measurement device first end and a second location force at the speed measurement device second end. The method further including using the speed measurement device, comparing the first location force and the second location force. The method still further including using the advancement device, adjusting the second location speed until the speed measurement device indicates the difference between the first location force and the second location force are within an optimal position tolerance.

Still further yet, an example of the present disclosure relates to a transmission line speed adjustment system for synchronizing a first location speed and a second location speed including a conduit configured to receive a transmission line from a first location at the first location speed and guide the transmission line to a second location. The transmission line speed adjustment system further including an advancement device, the advancement device positioned at the second location. The advancement device configured to receive the transmission line from the conduit and advance the transmission line at the second location speed. The transmission line speed adjustment system also including a means for measuring a transmission line force positioned between the conduit and the advancement device. The transmission line force is applied to the means for measuring a transmission line force when the first location speed is not equal to the second location speed. The transmission line speed adjustment system also includes a means for synchronizing a speed of the transmission line at a first location to a speed of transmission line at the second location by adjusting the first location speed or the second location speed to decrease the transmission line force.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of examples of the present disclosure and therefore do not limit the scope of the present disclosure. Examples of the present disclosure will hereinafter be described in conjunction with the appended drawings, wherein like numerals denote like elements.

FIG. 9 is a side view of an example advancement device including a speed measurement device, wherein the speed measurement device is in an extended position.

FIG. 13 is a schematic block diagram illustrating another example of the local controller of a component of the transmission line installation system.

DETAILED DESCRIPTION

Figure 1:
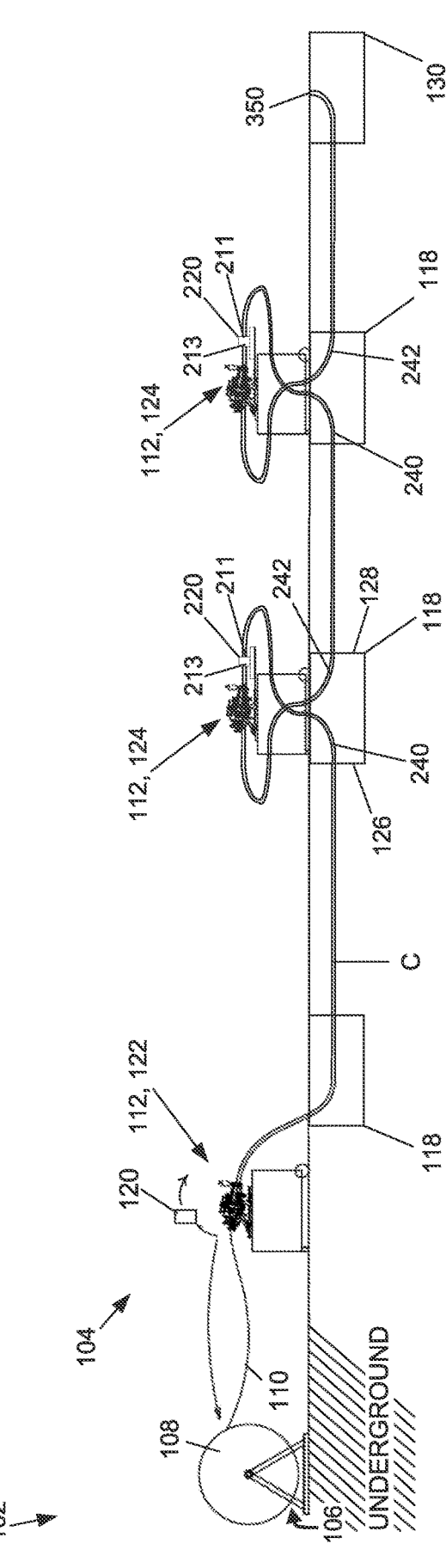
FIG. 1 is a schematic diagram illustrating an example transmission line installation system.

Various examples will be described in detail with reference to the drawings, wherein like reference numerals represent like parts and assemblies throughout the several views.

The present disclosure relates to a transmission line installation system, which can be used to install a transmission line. The term "transmission line" is used herein as a generic term for any type of wire, cable, or other elongate structure capable of transmitting energy, whether in the form of a fiber optic cable, power line, electrical cable, telephone line (copper line), coaxial cable, or the like. In typical embodiments the transmission line installation system is configured to install a transmission line within a conduit. In embodiments, a conduit may be a broad term such that a duct may be an example of a conduit. Additionally, a transmission line installation system can also be used for other purposes, such as for installing a pull tape or other pull line, a duct, or other items within a conduit.

Although the term "transmission line" is sometimes used (such as in radio-frequency engineering) to refer to a specific type of line used to carry radio frequency signals, the term "transmission line" is not intended to be so limited in the present disclosure, but rather is intended to broadly include the transmission of any type of energy or signal (electricity, radio frequency, light, etc.) along an elongate and flexible structure. Specifically, examples of transmission lines include those that can transmit electricity, such as a wire; or light, such as a fiber optic cable including optical fibers.

The installation of transmission lines through access points requires advancement devices that are configured to receive at least one transmission line at an access point first end, apply an additional force to the at least one transmission line if necessary, and advance the at least one transmission line to an access point second end regardless of where the access point second end is placed in three-dimensional space relative to the access point first end. Examples of components that may be placed within the conduit are discussed herein, including ducts and transmission lines.

Furthermore, to synchronize multiple advancement devices within the transmission line installation system, the transmission line must be advanced at a uniform speed throughout the transmission line installation system. It is desirable to measure the forces applied to the transmission line from each advancement device and provide feedback to the transmission line installation system using a speed measurement device. A force applied to the transmission line from an advancement device may then be adjusted until the transmission line is advanced at a uniform speed between each advancement device. Examples of the speed measurement device and its interaction with other components in the transmission line installation system are discussed herein.

Although references herein are made to a duct, the installation of a duct is not required to install a transmission line. Transmission lines may be optionally installed within a duct to divide a larger conduit into smaller subsections. Therefore, other components that are used to install or mount a duct within a conduit are also not required but may be optionally included within the transmission line installation system. Furthermore, a duct or conduit may optionally include a casing for housing the duct or conduit below the ground.

FIG. 1 is a schematic diagram illustrating an example transmission line installation system 100 being used to install a transmission line 110 at a site. In the illustrated example, the transmission line installation system 100 includes a transmission line source 102 and a transmission line conveying system 104. The example transmission line source 102 includes a reel stand 106 for holding a transmission line reel 108 containing a transmission line 110 (alternatively referred to herein as a transmission cable). The example transmission line conveying system 104 includes an advancement device 112 for advancing the transmission line 110 at an access point 118.

Furthermore, the transmission line installation system 100 includes a conduit C for receiving the transmission line 110 and guiding the transmission line 110 from one access point 118 to another access point 118 or an end access point 130. In embodiments, the conduit C consists of multiple components that are connected to form one continuous conduit C, such as C1, C2, C3, etc. In some embodiments, the conduit C is positioned above the ground. In some embodiments, the transmission line source 102 can be an advancement device 112 that provides a transmission line 110 to a downstream subsequent advancement device 124 within the transmission line installation system 100. As used herein, upstream may mean closer to the transmission line source 102 and downstream may mean farther from the transmission line source 102. An upstream advancement device 112 can include an initial advancement device 122 or a subsequent advancement device 124. The initial advancement device 122 is configured to receive a transmission line 110 from a transmission line source 102 such as a reel stand 106. A subsequent advancement device 124 is configured to receive a transmission line 110 from an initial advancement device 122 or an upstream subsequent advancement device 124 within a transmission line installation system 100. An example initial advancement device 122 is described in further detail with reference to FIGS. 2-3. An example subsequent advancement device 124 is described in further detail with reference to FIGS. 4-6.

The transmission line conveying system 104 is a machine that operates to install a transmission line 110 into the conduit C. Examples of transmission line conveying systems 104 include advancement devices 112 such as line puller systems, line pusher systems, line blowing systems, or systems that function the same. The example shown in FIG. 1 shows an advancement device 112 including an advancement device drive assembly 150 (not shown) configured to push or pull a transmission line 110 as well as a line blower assembly 180 (not shown) configured to advance a transmission line 110 using pressurized fluid.

In some embodiments a transmission line conveying system 104 includes a combination of one or more line pushers and one or more advancement devices 112. Additionally, in some embodiments an advancement device 112 includes a line puller, and in some embodiments a line puller system includes a line blower assembly 180. The transmission line conveying system 104 can also include one or more other types of transmission line advancement devices 112, alone or in combination.

The reel stand 106 supports a transmission line reel 108 configured to store, dispense, and retract a transmission line 110. In certain embodiments, the transmission line reel 108 may contain a large distance of transmission line 110 of at least 10,000 feet.

The advancement device 112 includes a plurality of components configured to advance a transmission line 110 through a conduit C. In some embodiments, the transmission line installation system 100 can include a plurality of advancement devices 112 as shown. In some embodiments, the advancement device 112 can be either an initial advancement device 122 or a subsequent advancement device 124.

The subsequent advancement device 124 may include a speed measurement device 220 for measuring the speed of the transmission line 110 at a first location relative to the speed of the transmission line 110 at a second location. The speed measurement device 220 includes a speed measurement device first end 211 configured to receive the transmission line 110 from the first location and a speed measurement device second end 213 configured to allow the transmission line 110 to pass through the speed measurement device 220 to a subsequent advancement device 124. In some embodiments, the speed measurement device 220 may be a slide block configured to slide relative to the advancement device 112 when the speed of the transmission line 110 at the first location and the speed of the transmission line 110 at the second location are not equal. In some embodiments, the speed measurement device 220 communicates the speed of the transmission line 110 at the first location relative to the speed of the transmission line 110 at the second location to other components 340 in the transmission line installation system 100 via a control unit 120 and/or local controller 160. The control unit 120 and/or local controller 160 is configured to communicate with an advancement device 112 to increase or decrease a force that is applied to the transmission line 110. In some embodiments, the control unit 120 communicates with the advancement device 112 to adjust the speed of the transmission line 110 until the speed measurement device 220 indicates the difference between the speed of the transmission line 110 at the first location and the speed of the transmission line 110 at the second location is within an optimal position tolerance 217. The optimal position tolerance 217 indicates a range of positions where a speed measurement device 220 indicates damage to the transmission line 110 and the overall transmission line installation system 100 is unlikely to occur. The speed measurement device 220 and its interaction with other components 340 of the transmission line installation system 100 is illustrated and described herein with respect to FIGS. 4-6 and 9-15.

Furthermore, the advancement device 112 may include an incoming conduit segment 240 and an outgoing conduit segment 242. The incoming conduit segment 240 is configured to receive a transmission line 110 from a conduit C at an access point first end 126 and guide the transmission line 110 to the advancement device 112. The outgoing conduit segment 242 is configured to receive a transmission line from the advancement device 112 and guide the transmission line 110 to a conduit C at an access point second end 128. In embodiments, the access point first end 126 and the access point second end 128 may be located on the same side of an access point 118.

The transmission line installation system 100 is usable by one or more installation technicians to install a transmission line 110 into the site. In some embodiments, the transmission line installation system 100 is automated such that a transmission line 110 may be installed throughout a conduit C without requiring the use of one or more installation technicians.

In a typical scenario, one or more conduits C are buried underground at a site along a desired route prior to cable installation. The conduit includes access points 118, which are openings in the conduit through which the interior of the conduit can be accessed. In some embodiments the access points 118 are placed at predetermined locations based on a maximum estimated advancement distance that the advancement device 112 can advance the transmission line 110. As the maximum advancement distance of the advancement device 112 is increased, fewer access points 118 are required, which significantly reduces the costs of installing a transmission line 110. As depicted in the example illustrated in FIG. 1, the conduit C may extend from the advancement device 112 to a distal end 350.

The transmission line installation system 100 further includes a control unit 120 configured to operate various components along the transmission line installation system 100. An example control unit 120 is illustrated and described in further detail with reference to FIG. 12. The transmission line installation system 100 may include any number of advancement devices 112 placed along the length of the conduit C. The transmission line installation system 100 may end at an end access point 130.

Examples of a transmission line installation system 100 that can advance a transmission line 110 through at least one advancement device 112 are described in further detail in U.S. Non-Provisional application Ser. No. 17/761,962 and U.S. Provisional Application 63/355,571, the disclosures of which are hereby incorporated by reference in their entireties.

Figure 2:
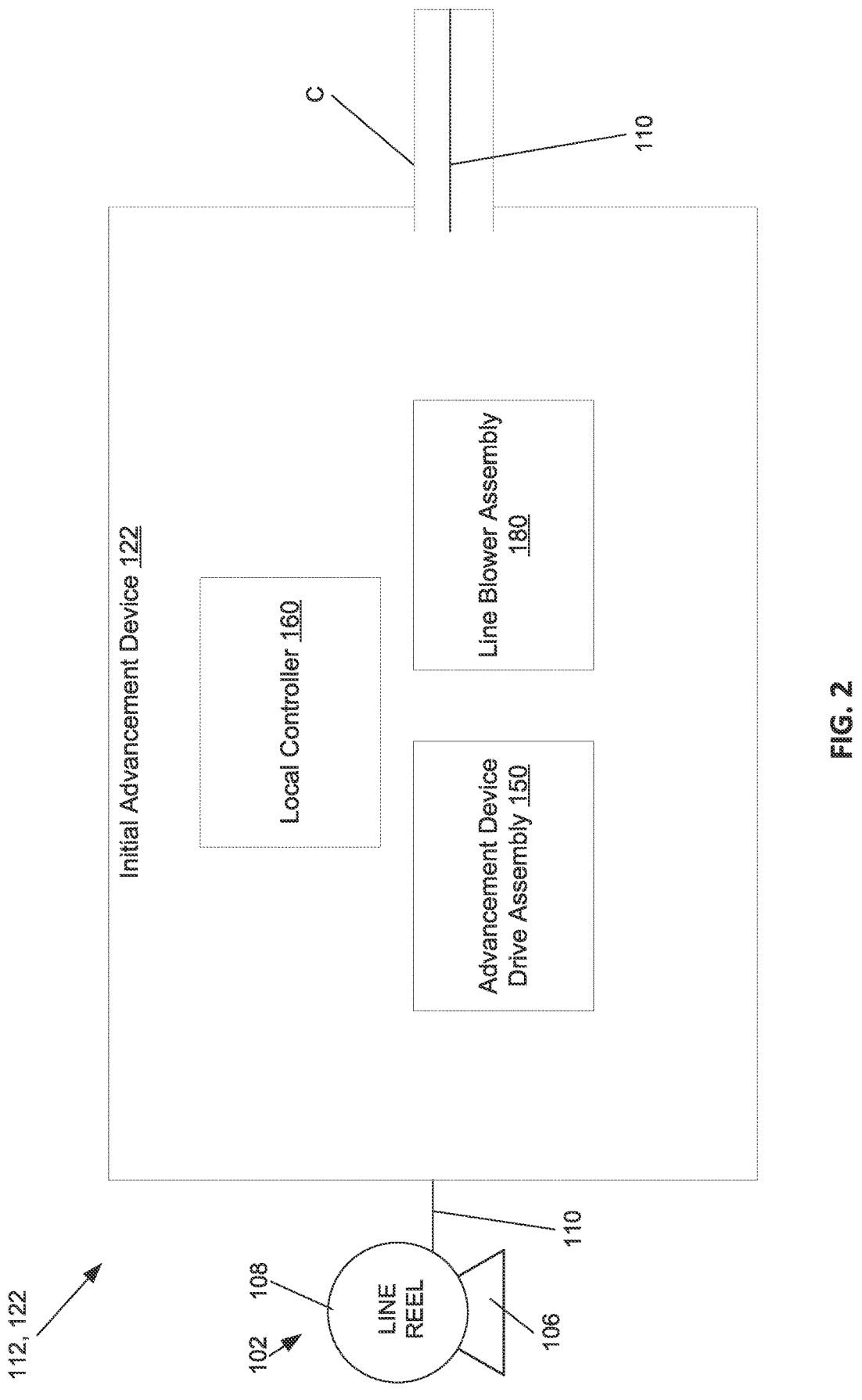
FIG. 2 is a block diagram of an example initial advancement device within the transmission line installation system of FIG. 1.

FIG. 2 illustrates and describes an example advancement device 112. Specifically, FIG. 2 illustrates an initial advancement device 122. The initial advancement device 122 receives a transmission line 110 from a transmission line source 102. In certain embodiments, the transmission line source 102 may include a transmission line reel 108. In certain embodiments, the transmission line reel 108 may be positioned on top of a reel stand 106. The initial advancement device 122 receives the transmission line 110 from the transmission line source 102 and advances the transmission line 110 using an advancement device drive assembly 150 and a line blower assembly 180. The advancement device drive assembly 150 and line blower assembly 180 are illustrated and described in further detail with reference to FIGS. 3-6. The advancement device 112 further includes a local controller 160 configured to control various components within the advancement device 112. After receiving the transmission line 110 from a transmission line source 102 and applying an advancement force to the transmission line 110, the initial advancement device 122 is configured to advance a transmission line 110 to a conduit C.

Figure 3:
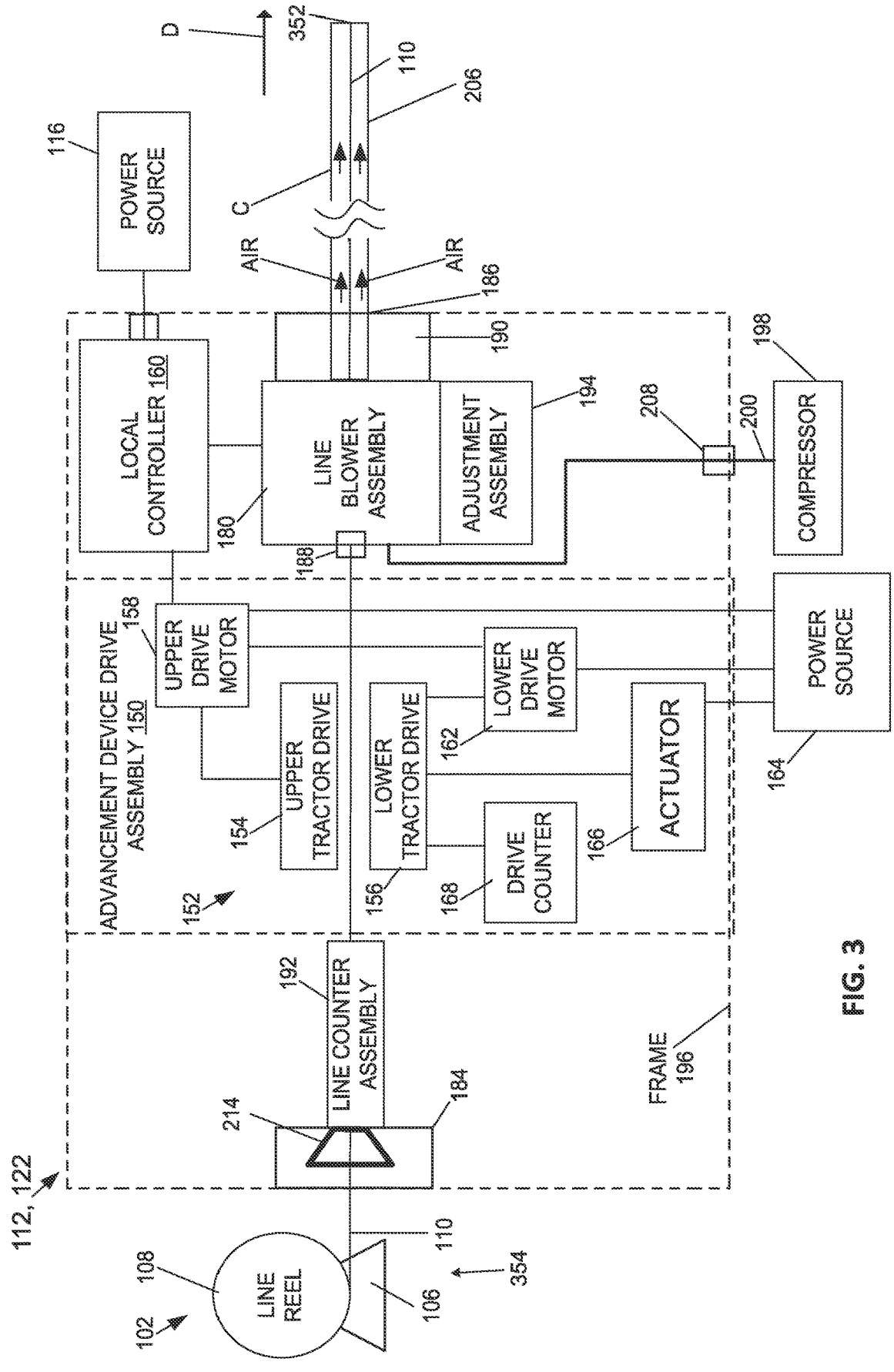
FIG. 3 is a cross-sectional view of the example initial advancement device within the transmission line installation system of FIGS. 1-2.

FIG. 3 is a cross-sectional view of the example initial advancement device 122 within the transmission line installation system of FIG. 1. The initial advancement device 122 is an example advancement device 112 having a transmission line source 102 such as a transmission line reel 108. The transmission line 110 is provided to the initial advancement device 122 by the transmission line source 102, which may include a reel stand 106 supporting a transmission line reel 108 for supplying transmission line to the initial advancement device 122. The example initial advancement device 122 includes an advancement device drive assembly 150, a local controller 160, and a line blower assembly 180 as shown in FIGS. 3-6.

The advancement device drive assembly 150 includes a tractor drive assembly 152 having an upper tractor drive 154 and a lower tractor drive 156. The upper tractor drive 154 and the lower tractor drive 156 are driven by an upper drive motor 158 and a lower drive motor 162, respectively. The upper drive motor 158 and the lower drive motor 162 are powered by a power source 164. In some embodiments, the power source 164 is a hydraulic, pneumatic, or electric motor.

Each tractor drive 154, 156 includes a moveable member (not shown). In some embodiments, an endless chain in each tractor drive 154, 156 is driven by the upper drive motor 158 and the lower drive motor 162 so as to frictionally engage the transmission line 110 and apply an advancement force to the transmission line 110. In the illustrated embodiment, the upper and lower tractor drives 154, 156 oppose each other and are aligned in an advancement direction D. Other moveable drive members besides opposed endless chains are possible including wheels and/or belts. Further, the moveable members can be arranged in V-shape, for example.

In some embodiments the advancement device 112 includes a manual actuator configured to manually adjust the second location speed, such as to manually adjust the speed to slow down or speed up the tractor drive assembly 152. Examples of manual actuators include a lever, a slide switch, and a rotatable knob.

The advancement device drive assembly 150 may include a lower drive counter 168 for monitoring movement of the lower tractor drive 156, which is indicative of the speed of the advancement device drive assembly 150, and correspondingly indicative of the speed of the transmission line 110 as it enters the conduit C. Such speed monitoring is important for preventing excessive relative speed between the advancement device drive assembly 150 and the transmission line 110 during slippage, which occurs when the transmission line 110 travels at a speed that is greater than or less than the upper and lower tractor drives 154, 156. Furthermore, speed monitoring is important for synchronizing an advancement speed of the transmission line 110 at each advancement device 112 within the transmission line installation system 100.

Further yet, the speed monitoring is also important so that it can be communicated to other components 340, such as to synchronize their operations within a single advancement device 112 (such as to keep several advancement devices 112 all operating at the same speed) or to synchronize their operations with multiple advancement devices 112. The speed is communicated from the lower drive counter 168 to the local controller 160 which receives the speed measurement. The speed can then be communicated from the local controller 160 to other components 340 or the control unit 120. The control unit 120 can then communicate that speed to other advancement devices 112 within the transmission line installation system 100. Alternatively, the speed monitoring can be used to adjust the speed of the advancement device 112 so that it matches an instructed speed. For example, if the local controller 160 receives an instruction from a control unit 120, or a global controller to adjust to a certain speed of operation, the speed measurement can be used to determine whether the speed needs to be increased or decreased to match the instructed speed, and to confirm once the instructed speed has been achieved. This enables a plurality of advancement devices 112 to communicate with one another to synchronize and operate at a uniform speed. Operating at a uniform speed is desirable because it prevents segments of a transmission line 110 from traveling at non-uniform speeds, which may result in coiling and damaging the transmission line 110. The control unit 120 (not depicted in FIG. 3) is illustrated and described in further detail with reference to FIGS. 12 and 14. The local controller 160 is illustrated and described in further detail with reference to FIGS. 12-14.

The initial advancement device 122 provides an advancement force for the installation of the transmission line 110 to be pulled from the transmission line reel 108, or other transmission line source 102, and inserted into an interior of conduit C. The conduit C can be any of a variety of known ducts, such as polyethylene, suitable for receiving and storing the transmission line 110. Once installed, the transmission line 110 can subsequently be used, such as for transmission of light or electrical signals, or power. As discussed, herein, the transmission line 110 can be any of a variety of known cables or wires used for transmitting energy or signals, including fiber optic cable having one or more optical fibers contained therein, and preferably having a circular outer perimeter. The advancement device 112 receives the transmission line 110 at an inlet 184, and the transmission line 110 exits the advancement device 112 at an outlet 186. The conduit C extends from the advancement device 112 to the distal end 206, which can be several hundred feet or less away from the advancement device 112, or several thousand feet or more away from the advancement device 112. The inlet 184 and outlet 186 may include a lead-in guide 214 (also referred to as a transmission line guide) for guiding the transmission line into the advancement device 112. In embodiments, the lead-in guide 214 and the lead-out guide 212 are funnel shaped in a manner that will direct the transmission line 110 in a particular direction. In some embodiments the lead-in guide 214 and the lead-out guide 212 have a tapered configuration including a wide end for receiving the transmission line 110 and a narrow end for guiding the transmission line 110. In embodiments, there may be multiple lead-in guides 214 and/or lead-out guides 212 in an advancement device 112 or component 340. In some embodiments, a lead-in guide 214 may be found at junctions or joints.

In some embodiments the advancement device drive assembly 150 further includes a hold down system, such as an actuator 166, linked to the power source 164 by a power line. In some embodiments, the actuator is a clamp cylinder. The actuator 166 generates a predetermined normal force on the transmission line 110 between the upper and lower tractor drives 154, 156. Some slip is acceptable. Too much slip can cause transmission line 110 damage, such as by damaging the transmission line jacket. Too much slip may also limit the usefulness of the advancement device 112 if insignificant push forces are generated. A conduit C or duct usually contains some irregularities, joints and bends that can keep transmission line 110 from moving smoothly. Unless an appropriate normal force is generated (not too much slip), the pushing force may be inadequate to overcome the irregularities, and slip may occur too often, causing unnecessary transmission line 110 damage or insignificant transmission line push force. On the other hand, a normal force which is too high risks crush damage to the transmission line 110, and inadequate slippage, such that column damage will be more likely to occur as the advancement device drive assembly 150 continues to move the transmission line 110 when transmission line 110 is being slowed or stopped within the conduit C or duct. When slip does occur under high normal force loads, transmission line 110 damage may result. By providing for a predetermined normal force with the advancement device 112, predetermined slip levels can be monitored. This results in an appropriate level of slip, so as to not cause too many shutdowns of the advancement device 112 when transmission line 110 damage is not significantly at risk, but excessive slip is noted, and can be used to shut off the advancement device 112 to prevent damage.

Figure 17:
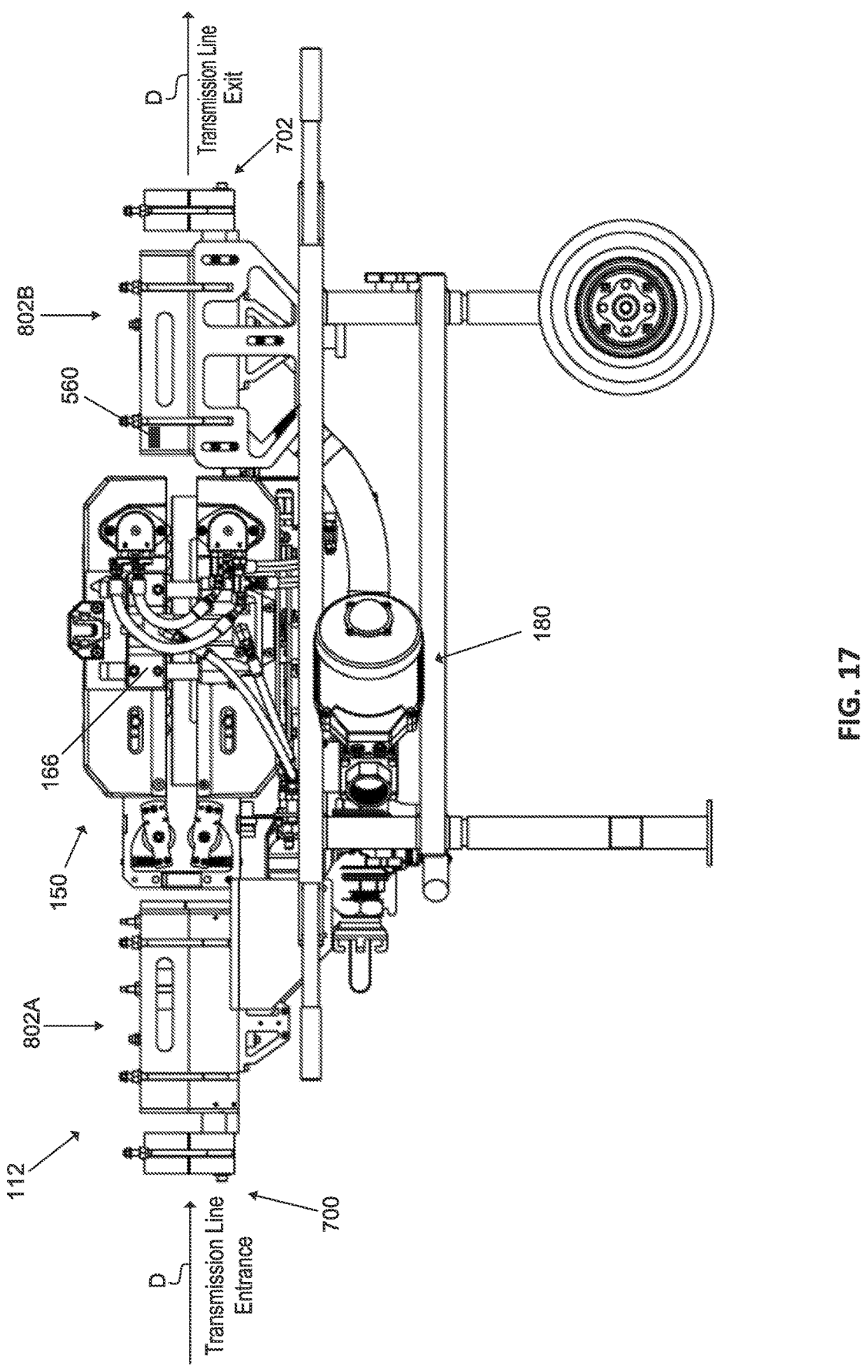
FIG. 17 is a side view of the advancement device illustrating the components of FIG. 16.

Some embodiments of the advancement device 112 further include a line blower assembly 180 for advancing a transmission line 110 through the advancement device 112 using pressurized fluid. In some embodiments, the pressurized fluid includes a gas or a liquid. In some embodiments, the advancement device 112 includes one or more of an inlet 184 and outlet 186 for receiving the transmission line 110 or for advancing the transmission line 110 beyond the advancement device 112, a line blower assembly 180, an air block 802 (as shown in FIG. 17), a seal 188, a duct mount assembly 190 (also sometimes referred to as a duct clamp or conduit receptable), a transmission line counter assembly 192, an adjustment assembly 194, and a frame 196.

The line blower assembly 180 is linked to a compressor 198, which generates appropriate fluid pressure. The air hose 200 and a valve 208 link the compressor 198 with the line blower assembly 180. The valve 208 can be manually or electronically adjustable. An electronically adjustable valve is electronically connected to the local controller 160, which can adjust the valve 208 between open and closed positions, or to various partially opened positions, to adjust the air flow through the blower and into the conduit C. Air pressure within the conduit C between a carrier (not shown) and the advancement device 112 causes a carrier to move toward the distal end 206 of the conduit C where it exits the conduit C.

The carrier is attached to a distal end 352 (also referred to as the leading edge) of the transmission line. The carrier slidably and scalably closes off conduit C from the atmosphere to create a pressure difference adjacent to the carrier. The pressurized air within the conduit C, behind the carrier, flows along sides of the transmission line 110 which can generate an advancement pulling force at the distal end 352 of the transmission line. The flow of air can also generate a pillow of air that helps to space the transmission line 110 from the interior surface of the conduit C to reduce frictional contact between the transmission line 110 and the conduit C. Further, if the carrier does not completely seal the duct, the air will flow along the conduit at a faster speed than the transmission line 110. This creates a distributed viscous drag between the air flow and the transmission line 110 that further helps to propel the transmission line 110 along the conduit C by pulling on the transmission line 110 along the entire length of the transmission line 110. A further advantage of this is that it reduces the required pushing and pulling forces that are localized to the distal end 352 and proximal end 354 of the transmission line (as shown in FIG. 3), which if too great can result in damage to the transmission line 110.

In some embodiments the advancement device 112 further includes the transmission line counter assembly 192, which monitors the speed of the transmission line 110 during operation. Preferably, the transmission line counter assembly 192 also monitors the length of the transmission line 110 passing through the advancement device drive assembly 150 from the transmission line reel 108. Similar to the line counter discussed herein for the reel stand 106, the line blower assembly 180 can similarly include an optical counter (not shown) that reads markings on the exterior of the transmission line 110 as it passes through the advancement device drive assembly 150. The length is communicated to and received at the local controller 160, for communication to other components 340 or the control unit 120. In some embodiments, the transmission line counter assembly 192 is used to detect slip of the transmission line 110 within the advancement device drive assembly 150. Slip typically occurs between the transmission line 110 and the advancement device drive assembly 150, such as the upper and lower tractor drives 154, 156. One way to detect slip is to compare the measurements read by the transmission line counter assembly 192 with other speed or distance measurements in the system, such as the blower distance measurement, or distance from the transmission line reel 108. When the speeds or distances do not match (or deviate by more than a particular amount), the system 100 can determine that the transmission line 110 is slipping in the advancement device drive assembly 150. Remedial action can then be taken, such as to reduce the air pressure, alert the operator, or other remedial action. In some embodiments, the transmission line counter assembly 192 is used to detect differences in the speed of the transmission line 110 at each advancement device 112. Differences in the speed of the transmission line 110 are caused by different advancement forces being applied to the transmission line 110 by various advancement devices 112 within the transmission line installation system 100. Remedial action can be taken to measure the speed of the transmission line 110 at a first location relative to the speed of the transmission line 110 at a second location and adjust the advancement speed of the transmission line 110 at a location to synchronize the advancement speed of the transmission line 110 throughout the transmission line installation system 100.

Figure 4:
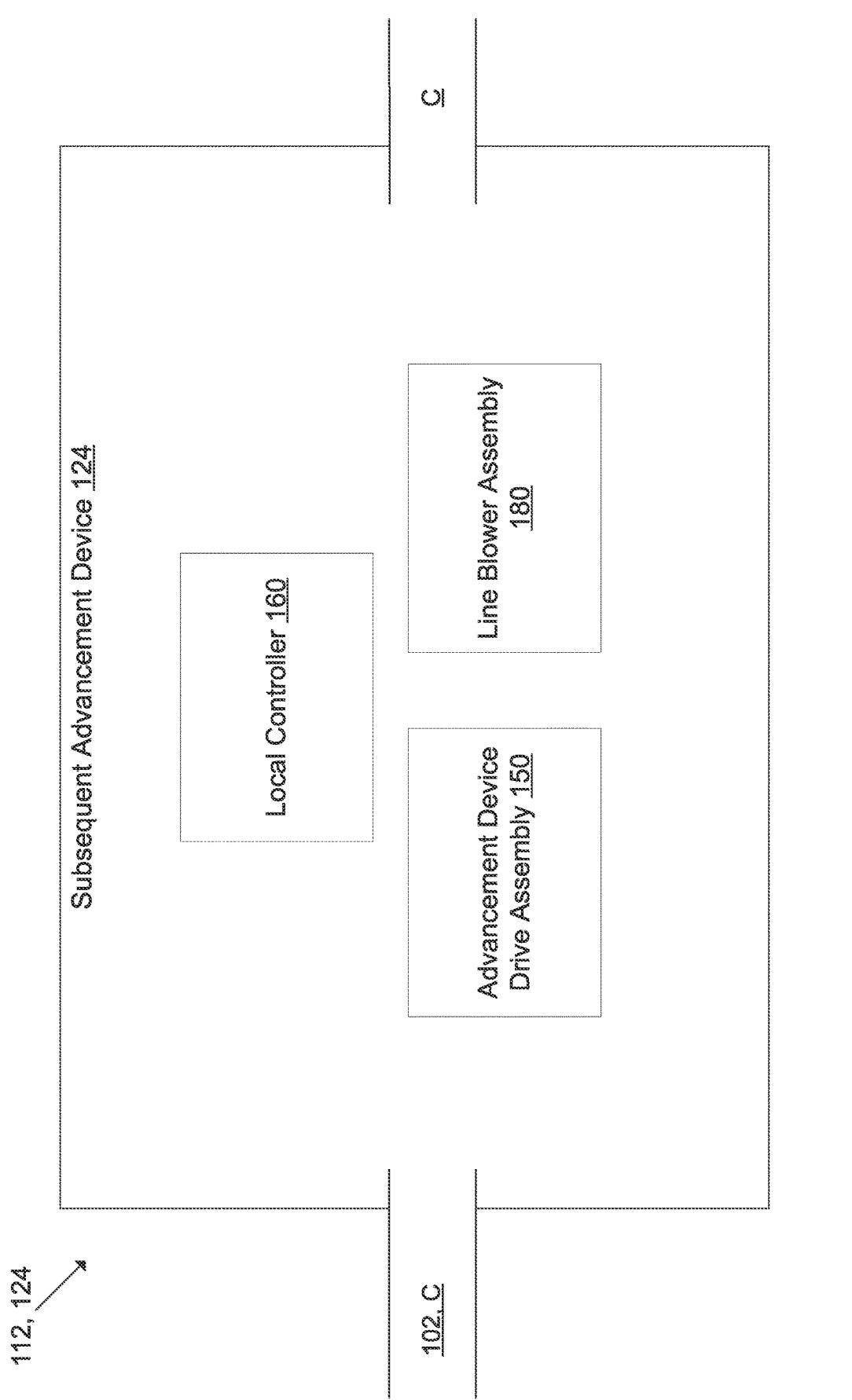
FIG. 4 is a block diagram of an advancement device, and specifically a subsequent advancement device, having a local controller, an advancement device drive assembly, and a line blower assembly for advancing a transmission line through a conduit.

FIG. 4 is a block diagram of an advancement device 112 of FIG. 1, and specifically a subsequent advancement device 124, having a local controller 160, an advancement device drive assembly 150, and a line blower assembly 180 for advancing a transmission line 110 through a conduit C. The subsequent advancement device 124 receives a transmission line 110 from the conduit C at a point in the transmission line installation system 100 that is downstream an initial advancement device 122 and a transmission line source 102. The subsequent advancement device 124 advances the transmission line 110 using an advancement device drive assembly 150 and a line blower assembly 180. The advancement device drive assembly 150 and line blower assembly 180 are illustrated and described in further detail with reference to FIGS. 3 and 6. The advancement device 112 further includes a local controller 160 configured to control various components within the advancement device 112. After receiving the transmission line 110 from a transmission line source 102 and applying an advancement force to the transmission line 110, the initial advancement device 122 is configured to advance a transmission line 110 to a conduit C.

Figure 5:
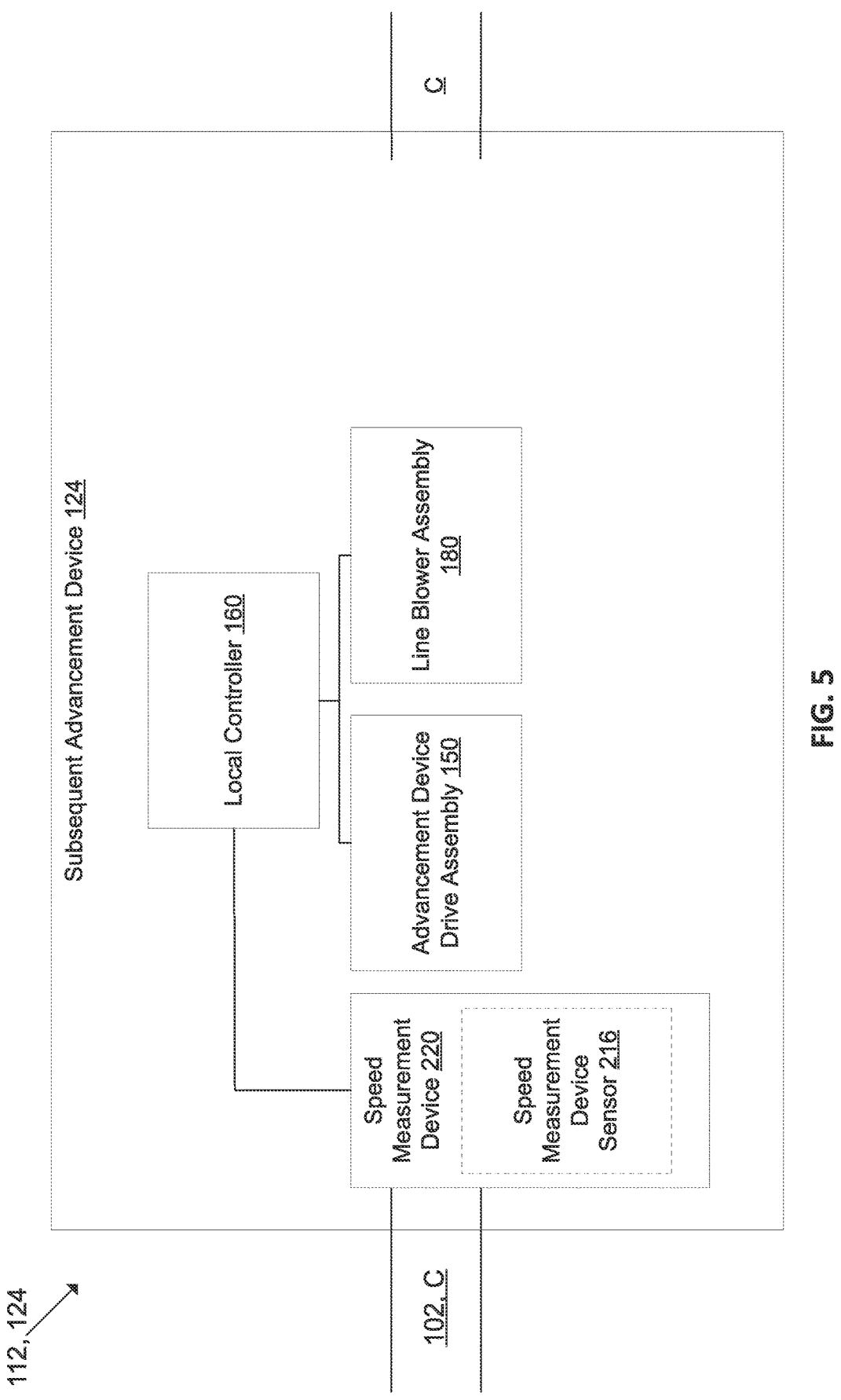
FIG. 5 is the advancement device of FIG. 4, including a speed measurement device having a speed measurement device sensor.

FIG. 5 is the advancement device 112 of FIG. 4, including a speed measurement device 220 having a speed measurement device sensor 216. In embodiments, the speed measurement device 220 may be a speed block. The speed block may be a movable member between two sources of speed indicating a difference between two speeds by its position.

In embodiments, the speed measurement device 220 measures a force applied by the advancement of the transmission line 110 at a speed measurement device first end 211 and a force applied by the advancement device 112 at a speed measurement device second end 213. In some embodiments, the speed measurement device 220 includes a slide block configured to slide relative to the advancement device 112 when speed measurement device 220 indicates the advancement speed of the transmission line 110 at a first location and the advancement speed of a transmission line 110 at a second location are not equal. In some embodiments, the first location includes an initial advancement device 122. In some embodiments, the first location includes a subsequent advancement device 124.

In some embodiments, the speed measurement device 220 communicates the measured forces to other components 340 in the transmission line installation system 100 via a control unit 120 and/or local controller 160. The local controller 160 can then adjust the speed of the advancement device drive assembly 150 and/or line blower assembly 180 to adjust the force applied to the transmission line 110 at the first location or the second location until the transmission line 110 travels at a uniform speed across multiple locations. The speed measurement device 220 and its interaction with other components 340 of the transmission line installation system 100 is illustrated and described herein with respect to FIGS. 4-6 and 9-15.

Figure 6:
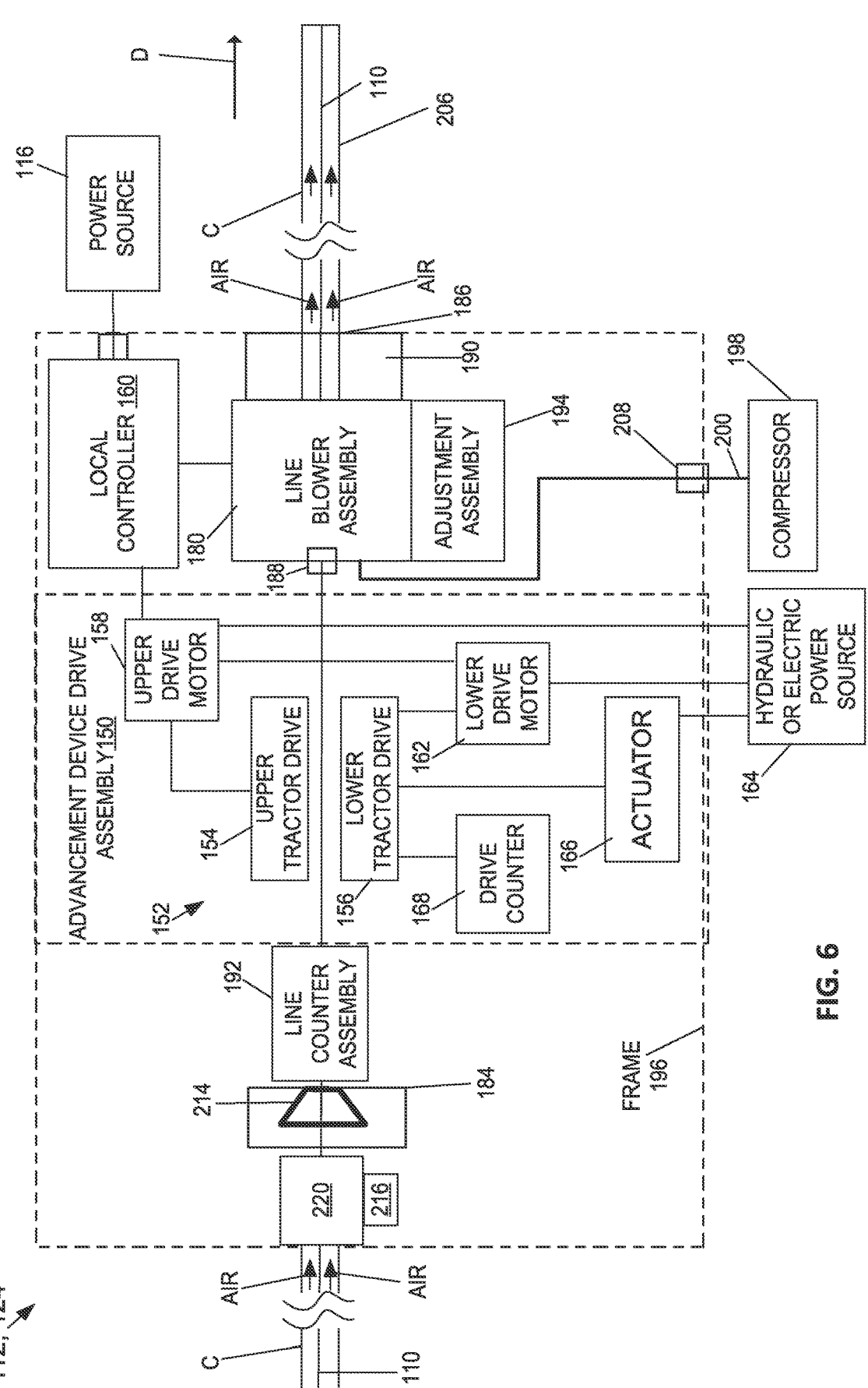
FIG. 6 is a cross-sectional view of the example subsequent advancement device of FIG. 5 further illustrating various components within the advancement device.

FIG. 6 is a cross-sectional view of the example subsequent advancement device 124 of FIG. 5 further illustrating various components within the advancement device 112. The subsequent advancement device 124 includes many of the same components as the initial advancement device 122, including the advancement device drive assembly 150 and the line blower assembly 180; however, the subsequent advancement device 124 receives a transmission line 110 at the speed measurement device 220, which may optionally include the speed measurement device sensor 216. The transmission line 110 is then received at an inlet 184.

Figure 7:
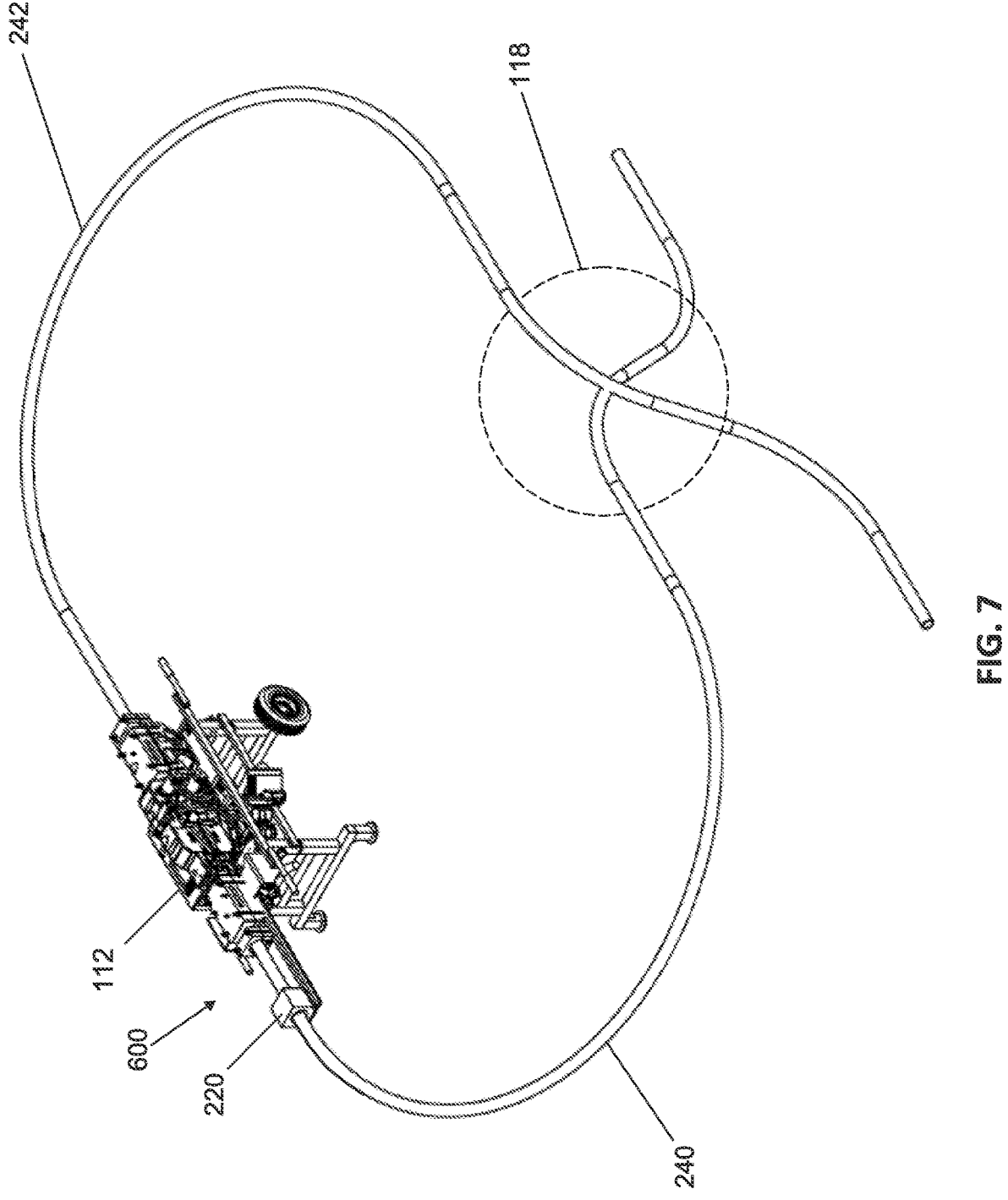
FIG. 7 is a side perspective view of an example transmission line speed adjustment system with an advancement device having an extended incoming conduit segment and an extended outgoing conduit segment for advancing a transmission line at an access point.

FIG. 7 is a side perspective view of an example transmission line speed adjustment system 600 with an advancement device 112 having an extended incoming conduit segment 240 and an extended outgoing conduit segment 242 for advancing a transmission line 110 at an access point 118. The extended incoming segment 240 and the extended outgoing segment 242 are desirable when accessing a conduit C beneath the ground. The example advancement device 112 may include either an initial advancement device 122 or a subsequent advancement device 124. The incoming conduit segment 240 and the outgoing conduit segment 242 allow for a transmission line 110 to be transferred to and from the advancement device 112 in a variety of configurations.

Figure 8:
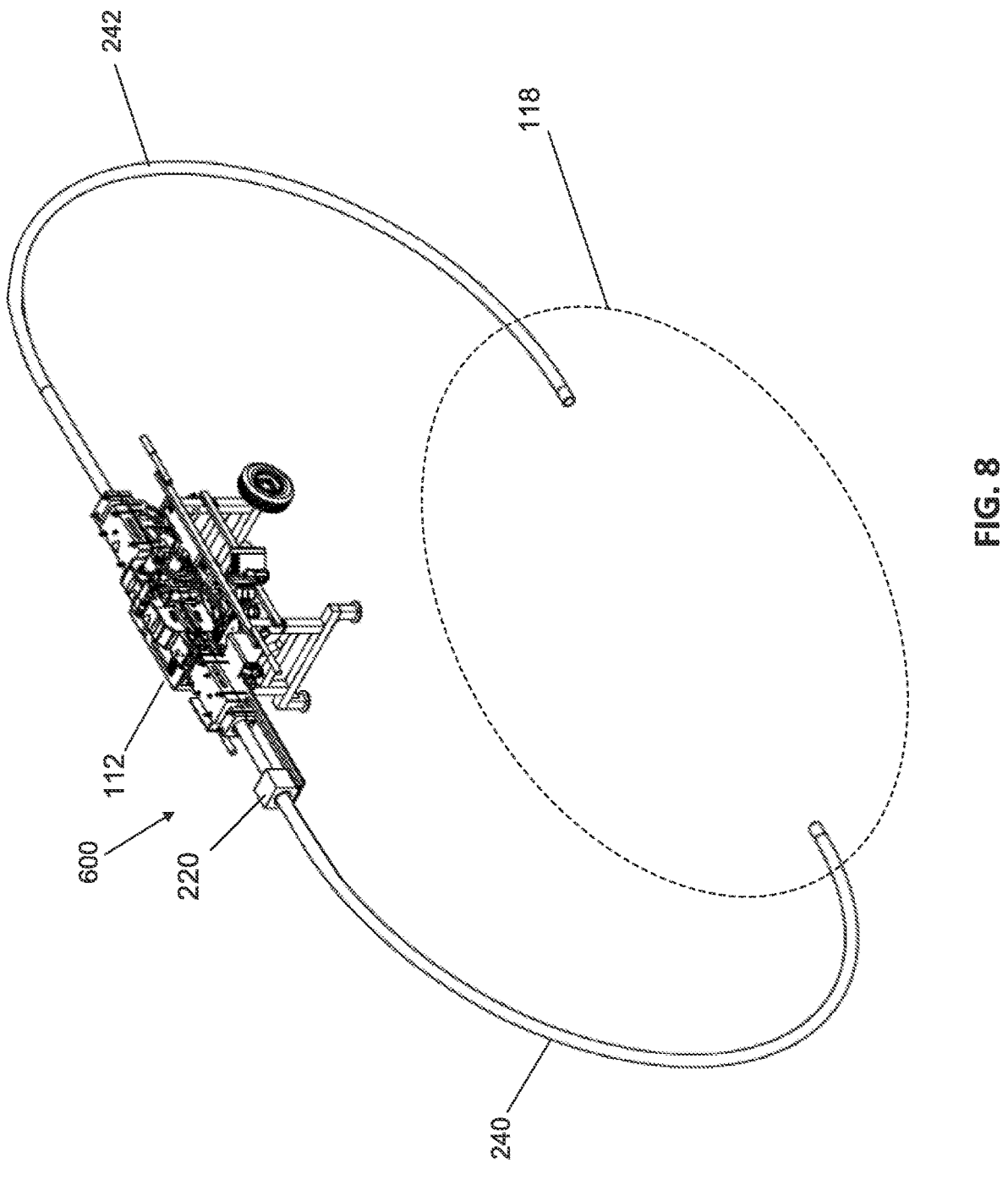
FIG. 8 is a side perspective view of an example transmission line speed adjustment system with an advancement device on a mobile cart having a speed measurement device connected to a shortened incoming conduit segment.

FIG. 8 is a side perspective view of an example transmission line speed adjustment system 600 with an advancement device 112 having a shortened incoming conduit segment 240 and a shortened outgoing conduit segment 242 for advancing a transmission line 110 at an access point 118. The shortened configuration of the incoming conduit segment 240 and the outgoing conduit segment 242 allows the advancement device 112 to be placed in a variety of configurations. The shortened incoming segment 240 and the shortened outgoing segment 242 are desirable when advancing a transmission line 110 above the ground or when using shortened segments 240, 242 is otherwise feasible.

Figure 9:
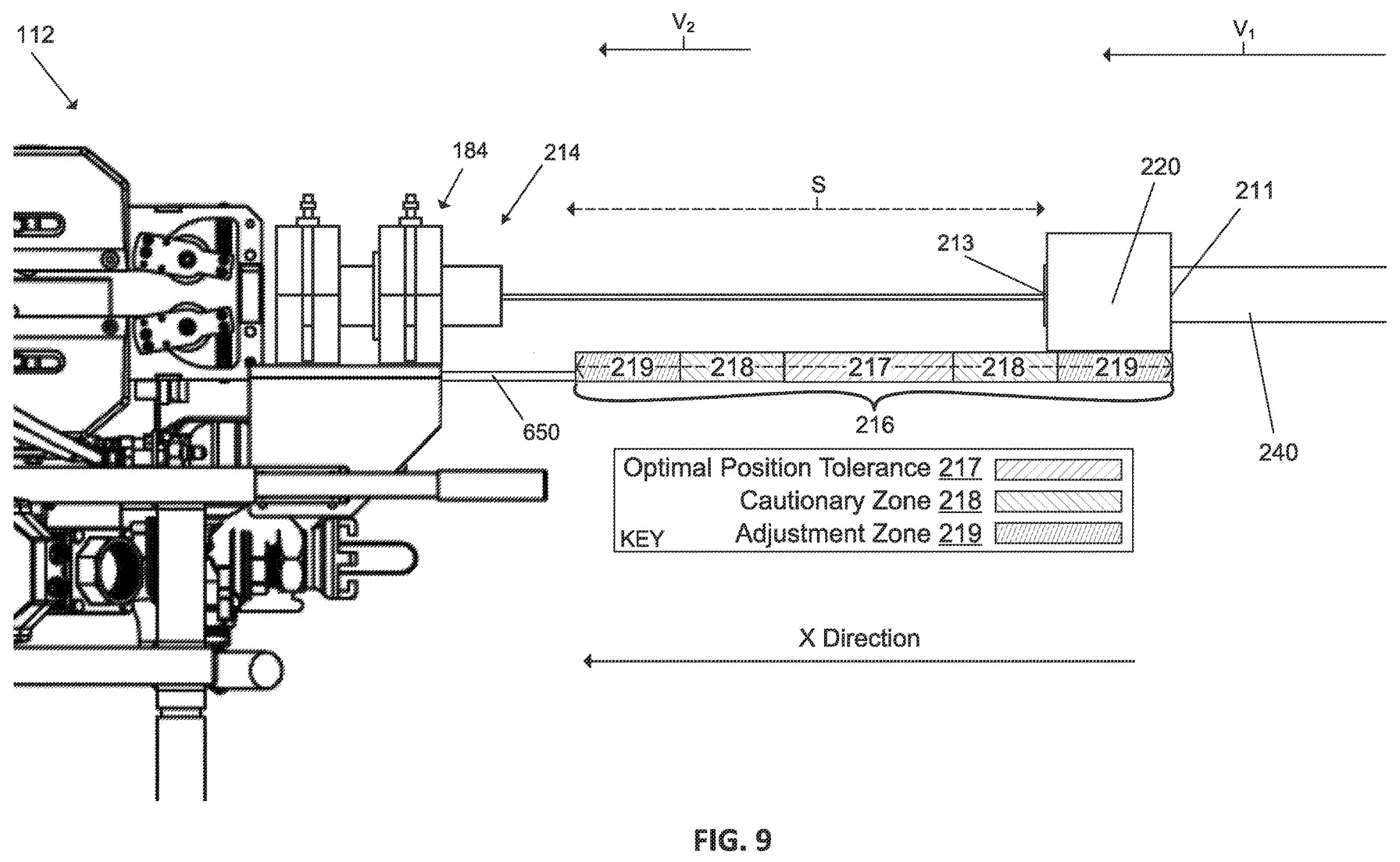

FIG. 9 is a side view of an example advancement device 112 including a speed measurement device 220, wherein the speed measurement device 220 is in an extended position. In embodiments, the speed measurement device 220 may be a speed block. The speed block 220 may be a movable member that can move from an extended position to a shortened position, and a variety of positions therebetween.

The speed measurement device 220 is allowed to move freely, or slide, in one dimension in an x direction and a negative x direction (together the x axis). The speed measurement device 220 slides along a base 650 (such as a rail) when the transmission line 110 speed coming from an upstream advancement device 112 is unequal to the transmission line 110 speed at the second advancement device 112. This is illustrated in FIG. 9 with different velocities of the transmission line $V_1$, $V_2$ that are present at a speed measurement device first end 211 or a speed measurement device second end 213. In embodiments, $V_1$ and $V_2$ are indicative of the transmission line speed at two locations, such as the speed of the transmission line 110 at a first location, such as coming from an initial advancement device 122, and the speed of the transmission line 110 at a second location, such as at a subsequent advancement device 124.

The first velocity $V_1$ represents the velocity of the transmission line 110 as it approaches the speed measurement device first end 211 from an incoming conduit segment 240. In certain embodiments, if the speed measurement device 220 is located at a first subsequent advancement device 124 in a transmission line installation system 100, the first velocity $V_1$ may be dependent upon the speed at which an initial advancement device 122 retrieves a transmission line 110 from a transmission line source 102 and advances the transmission line 110 to the subsequent advancement device 124. In certain embodiments, if the speed measurement device 220 is located downstream of the first subsequent advancement device 124 in the transmission line installation system 100, then the first velocity $V_1$ may be dependent upon the speed at which an initial advancement device 122 retrieves the transmission line 110 from the transmission line source 102 and the speed at which any upstream subsequent advancement devices 124 receive and advance the transmission line 110.

The second velocity $V_2$ represents the velocity of the transmission line 110 as it exits the speed measurement device 220 at the speed measurement device second end 213 and is advanced by an advancement device 112 located downstream of the speed measurement device 220. The advancement device 112 that is located downstream of the speed measurement device 220 may not be synchronized to advance the transmission line 110 at the same speed as advancement devices 112 that are located upstream of the speed measurement device 220. Thus, in certain examples, the second velocity $V_2$ is not equal to the first velocity $V_1$. When this occurs, the speed measurement device 220 will move in the direction of the greater speed (e.g., if the first speed $V_1$ is greater than the second speed $V_2$ as shown in this Figure, then the speed measurement device 220 will move toward the incoming conduit segment 240, or vice-versa). It is desirable to have the first velocity $V_1$ and the second velocity $V_2$ approximately equal because it prevents damage to the transmission line 110 that occurs when the transmission line 110 is stretched or coiled.

The speed measurement device sensor 216 may measure the movement of the speed measurement device 220 along a base 650, which is an x-axis. The speed measurement device sensor 216 may include a manual indicator configured to be read by a human user operating the transmission line installation system 100, or it may be configured to operate automatically using one or more sensors 216. The sensor(s) 216 may include a speed measurement device sensor 216 configured to read a change of position in the speed measurement device 220 along the x axis. In certain embodiments, the speed measurement device sensor 216 may include an optical sensor, a potentiometer, a linear position sensor, a rotary position sensor, an angular position sensor, an inductive position sensor, an ultrasonic position sensor, a magnetostrictive position sensor, a capacitive position sensor, a fiber-optic position sensor, or any other position sensor. In embodiments, the sensor(s) are configured to measure a position of the speed measurement device 220 based on a slide distance S measured from the speed measurement device second end 213 to the inlet 184. In some embodiments, the sensor(s) are further configured to communicate the slide distance S to the advancement device 112 located downstream of the speed measurement device 220. In a particular embodiment, the advancement device 112 receives this communication via a local controller 160, which can then adjust the second velocity $V_2$ by adjusting the speed of the upper and lower tractor drive 154, 156 within the advancement device 112.

In certain embodiments, additional advancement devices 112 located upstream of the speed measurement device 220 within the transmission line installation system 100 may be adjusted by communicating the speed of the tractor drives 154, 156 of each advancement device 112 via the local controllers 160 and a control unit 120. Communication between multiple advancement devices 112 via local controller 160 and a control unit 120 is further illustrated and described herein with reference to FIG. 12. In embodiments, the speed measurement device 220 determines and communicates $V_1$, $V_2$. In other embodiments, the speed measurement device sensor 216 determines and communicates $V_1$, $V_2$. In some embodiments, the speed measurement device 220 and the speed measurement device sensor 216 work together to determines and communicates $V_1$, $V_2$.

The speed measurement device sensor 216 may also be configured to be read manually by a user positioned along the transmission line installation system 100. In certain embodiments, the speed measurement device sensor 216 may include an optimal position tolerance 217 (indicated with wide diagonal upper right to lower left shading) where the speed measurement device 220 is positioned on the speed measurement device sensor 216 such that the first velocity $V_1$ and the second velocity $V_2$ are equal or are within an allowable tolerance where damage to the transmission line 110 is unlikely to occur. In embodiments, the center of the optimal position tolerance 217 may be an optimal position. In another possible embodiment, the position of the speed measurement device 220 can be determined automatically by one or more sensors, and the advancement device 112 can automatically adjust the velocity in response.

In certain embodiments, the speed measurement device sensor 216 may include a cautionary zone 218 (indicated with wide diagonal upper left to lower right shading) positioned on both ends of the optimal position tolerance 217. The cautionary zone 218 provides an indication to the user that a manual adjustment may be made but is not always required. The speed measurement device 220 may slide into the cautionary zone 218 by either shortening or extending the incoming conduit segment 240. When the speed measurement device 220 is in the cautionary zone 218, the user may manually adjust the second velocity $V_2$ by adjusting the speed of the upper and lower tractor drive 154, 156 in the advancement device 112 located upstream of the speed measurement device 220. As the second velocity $V_2$ is adjusted, the position of the speed measurement device 220 will correspondingly adjust. An increase in the second velocity $V_2$ will move the speed measurement device 220 in the positive x direction (as denoted in this Figure by an arrow) and a decrease in the second velocity $V_2$ will move the speed measurement device 220 in the negative x direction. In embodiments, the speed measurement device 220 is a slide block. As shown in this figure, the user may adjust the speed measurement device 220 from an extended position back to the optimal position 217 by increasing the second velocity $V_2$. Furthermore, the first velocity $V_1$ may be also adjusted at the first location to synchronize the first velocity $V_1$ and the second velocity $V_2$.

Figure 10:
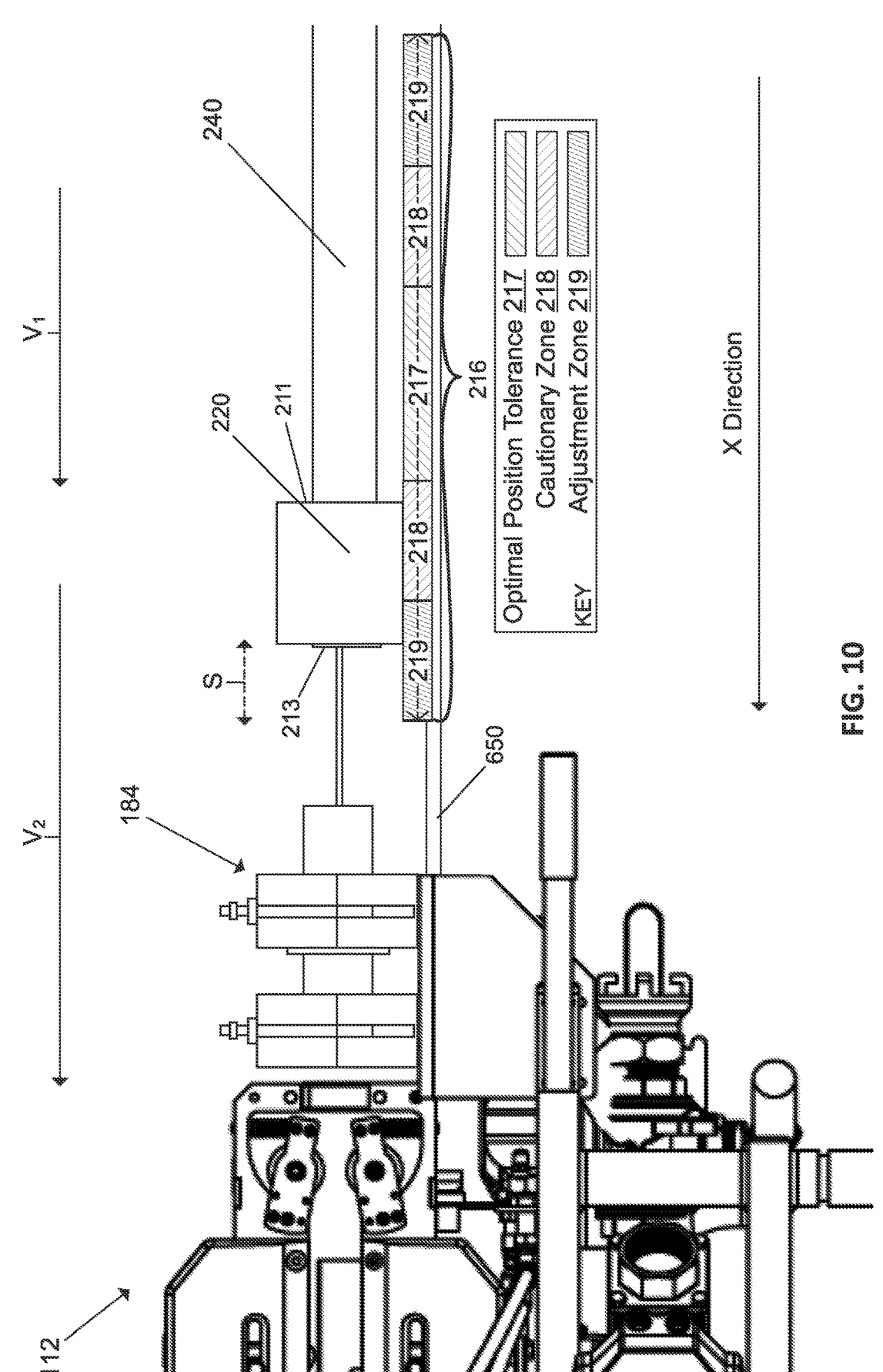
FIG. 10 is a side view of an example advancement device including a speed measurement device, wherein the speed measurement device is in a shortened position.
Figure 11:
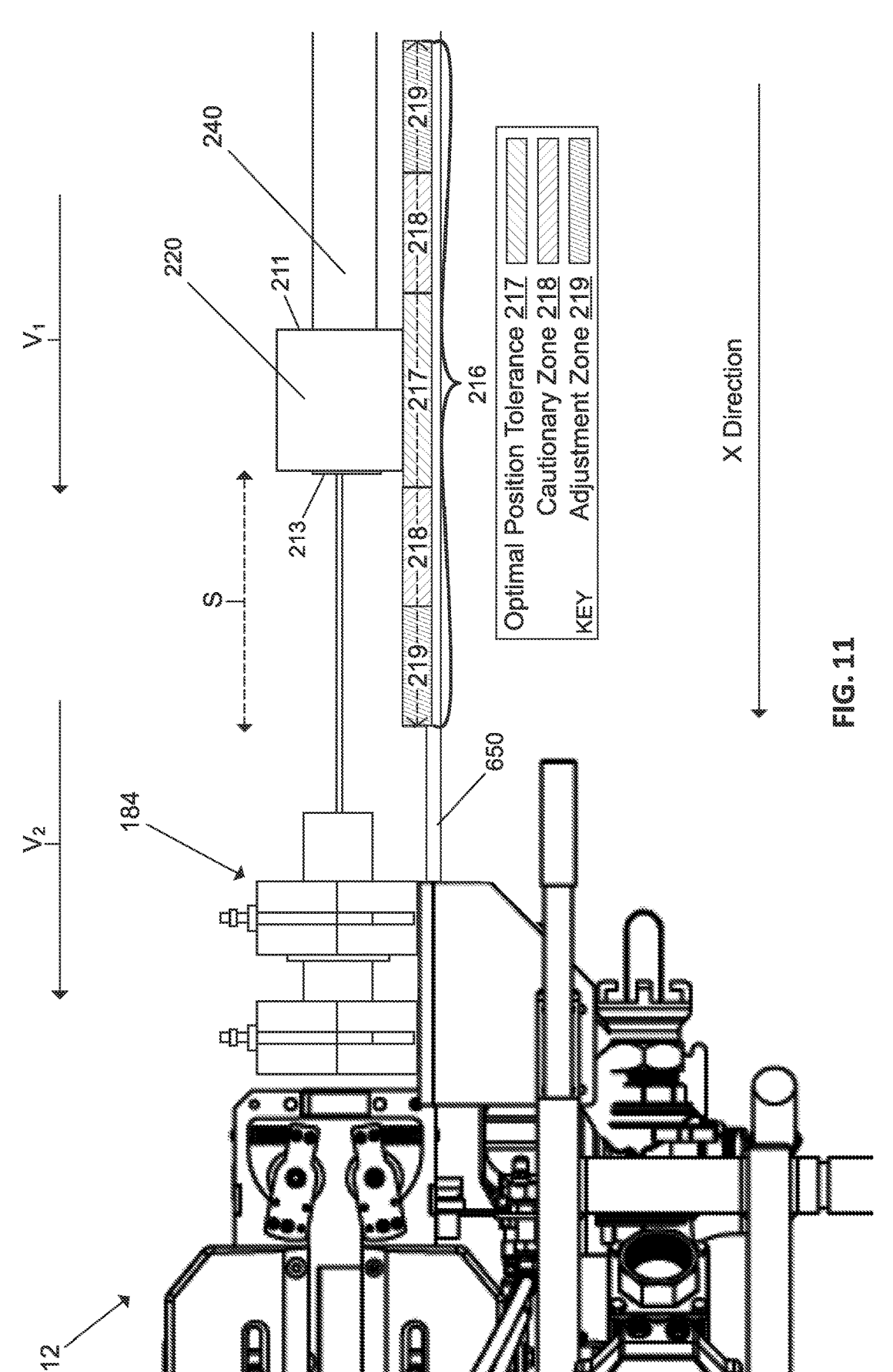
FIG. 11 is a side view of an example advancement device including a speed measurement device, wherein the speed measurement device is in an optimal position.

In certain embodiments, the speed measurement device sensor 216 may include an adjustment zone 219 (indicated with narrow diagonal upper right to lower left shading) positioned on both ends of the cautionary zone 218 (indicated with wide diagonal upper left to lower right shading). In a particular embodiment, there may be a color-coded visual indication of the status for the speed measurement device 220. For example, optimal position tolerance 217 may be indicated in green, the cautionary zone 218 may be indicated in yellow, and the adjustment zone 219 may be indicated in red. Embodiments of this color-coded system are depicted in FIGS. 9-11. These are just examples of colors and in different embodiments, different colors may be used. In embodiments, the adjustment zone 219, cautionary zone 218, and optional position tolerance 217 may be position markings that visually depict the position of the speed measurement device 220.

As shown in FIG. 9, the speed measurement device 220 is in the adjustment zone 219 in an extended configuration. The adjustment zone 219 provides an indication to the user that a manual adjustment is required to prevent damage to the transmission line 110. The speed measurement device 220 may slide into the adjustment zone 219 by either shortening or extending the incoming conduit segment 240. When this occurs, the user may manually adjust the second velocity $V_2$ by adjusting the speed of the upper and lower tractor drive 154, 156 in the advancement device 112 located upstream of the speed measurement device 220 as described above. A conduit with an adjustable length may be a coupled between the inlet 184 and the speed measurement device second end 213 to guide the transmission line from the speed measurement device second end 213 to the inlet 184.

FIG. 10 is a side view of an example advancement device 112 including a speed measurement device 220, wherein the speed measurement device 220 is in a shortened position.

As described herein with reference to FIG. 9, the speed measurement device 220 is shown located halfway between the cautionary zone 218 and the adjustment zone 219 in the shortened position. The position of the speed measurement device 220 may be adjusted to the optimal position tolerance 217 to mitigate damage to the transmission line 110 by adjusting the second velocity $V_2$. As shown in this Figure, a user would decrease the second velocity $V_2$ to shift the speed measurement device 220 in the negative x-direction (to the right in the FIG. 10 as shown). The user may make a predetermined adjustment of the second velocity $V_2$ based on the position of the speed measurement device 220 along the speed measurement device sensor 216 or the user may incrementally adjust the second velocity $V_2$ until the speed measurement device 220 is positioned within the optimal position tolerance 217. To mitigate damage to the transmission line 110 and move the speed measuring device 220 to the optimal position tolerance 217, a user may manually adjust the second velocity $V_2$ by adjusting the speed of the upper and lower tractor drive 154, 156 in the advancement device 112 located downstream of the speed measurement device 220 as described above.

FIG. 11 is a side view of an example advancement device 112 including a speed measurement device 220, wherein the speed measurement device 220 is in the optimal position tolerance 217. As shown in this Figure, the position of the speed measurement device 220 along the speed measurement device sensor 216 indicates the speed measurement device 220 is within the optimal position tolerance 217. When the speed measurement device 220 is within the optimal position tolerance 217, damage to the transmission line is mitigated, and the user need not perform an adjustment at this time.

Figure 12:
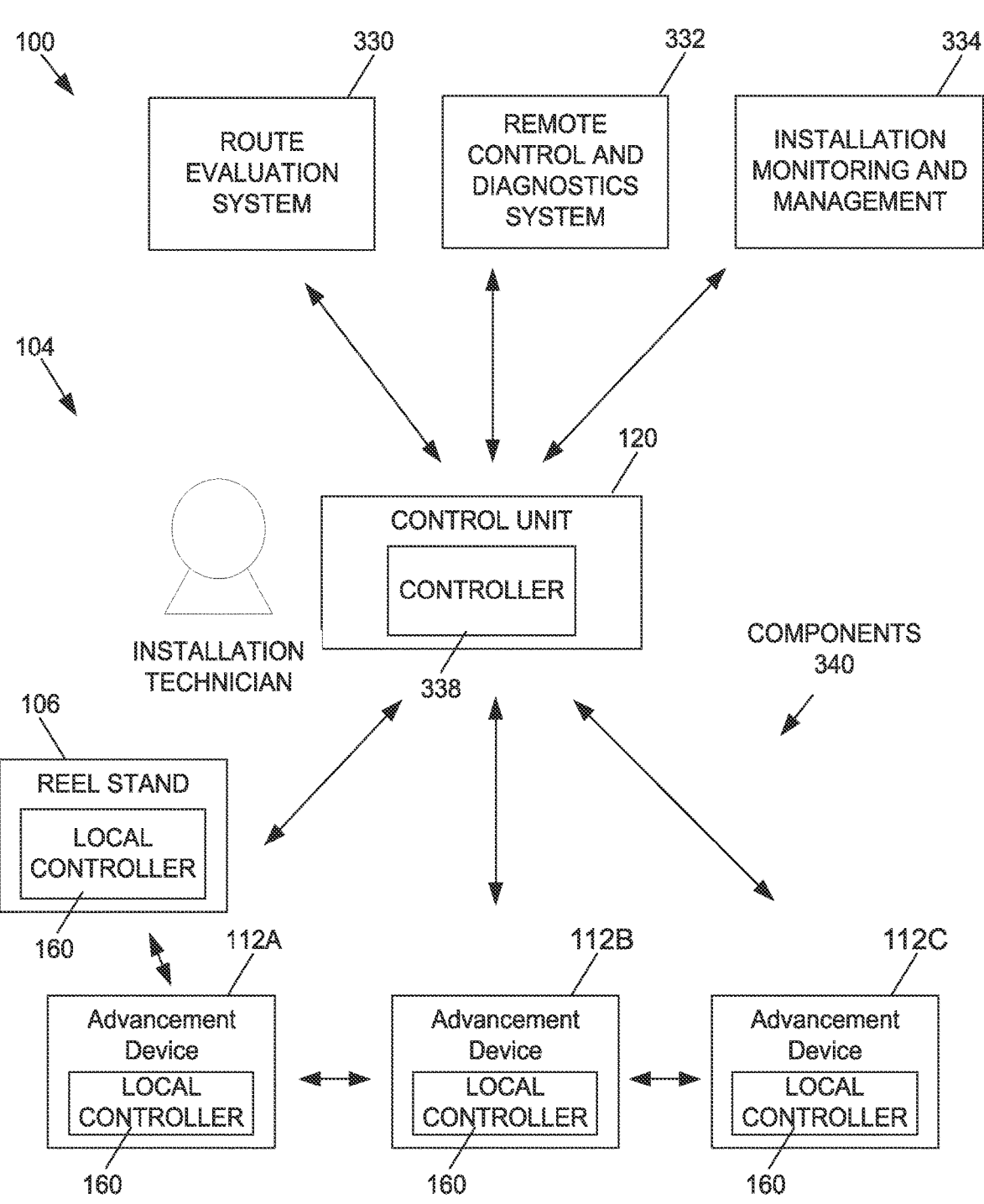
FIG. 12 is a schematic block diagram illustrating a control unit configured to communicate with at least one local controller to implement various control systems.

FIG. 12 is a schematic block diagram illustrating a control unit 120 configured to communicate with at least one local controller 338 to implement various control systems. Similar to the example shown in FIG. 1, the example transmission line installation system 100 includes the transmission line conveying system 104, which also includes advancement devices 112. In embodiments, multiple advancement devices 112A, 112B, 112C, may be used. Some embodiments further include one or more of a route evaluation system 330, a remote control and diagnostics system 332, and an installation monitoring and management system 334. The example transmission line conveying system 104 includes the control unit 120 and a plurality of components 340, such as advancement devices 112 and hydraulic or electric power sources. In some embodiments, the control unit 120 includes and operates as a controller 338 and the components 340 include local controllers 160.

A fluid injection machine (not shown) is another example of a component 340. An example of a fluid injection machine is a lubricating machine, which is operable to add (apply or inject) lubricant onto the transmission line 110 or into the conduit C. The lubricating machine can be arranged at the start of the run to apply lubricant to the transmission line 110 before it enters the duct, or to inject lubricant into the starting end of the conduit C. The lubricating machine includes a pump or other lubrication applicator, and includes a local controller operable to interact with the control unit 120 and/or other components 340, and to control the operation of the lubricating machine, such as to adjust the amount of lubricant being added to the transmission line 110 or conduit C, or to turn on or off the addition of lubricant. In some embodiments the lubricating machine has various types of lubricant and can select between those types depending on the conditions, and even adjust the lubricant on the fly as installation proceeds. In another possible embodiment, the fluid injection machine can be integrated into an advancement device 112. In some embodiments, the fluid injection machine can be integrated with and combined with a moisturizer unit and/or an injection fluid tank.

A transmission line cleaner (not shown) is another example of a component 340, which is operable to clean a transmission line before it enters the transmission line conveying system 104. The transmission line cleaner typically includes one or more cleaning mechanisms (motorized or non-motorized) such as sensors to detect foreign objects such as sand, mud, water, and the like, and determine whether and an extent of cleaning that is required, and then activates the cleaning mechanism to perform the appropriate cleaning. Cleaning mechanisms can include brushes, wipers, and water or other liquid baths. As with other components 340, the transmission line cleaner includes a local controller 160 to permit communication with other components 340, the control unit 120, and operates to control the operations of the cleaning mechanism itself. In some embodiments the transmission line cleaner is positioned before an optical detector (not shown but discussed herein) that reads markings on the exterior of the transmission line 110. The cleaning removes any obstructions on the markings that might otherwise interfere with the reading by an optical detector.

Some embodiments include a tether mechanism (not shown). A tether mechanism operates similarly to a line puller, but instead of pulling the transmission line 110 toward it, it operates instead to provide a back pressure to provide more precise speed control to the transmission line 110, such as when using an advancement device 112 to advance the transmission line 110 through the duct. The tether mechanism typically includes an elongate member (e.g., a tape or cable) that is connected to the transmission line 110 (directly or with a coupler). In some embodiments the elongate member is connected to the line carrier. A line puller is an example of a tether mechanism when it is operated in reverse. In another embodiment, the tether mechanism can include a brake or other controllable slip interface that is operable to apply a braking force to control a speed at which the transmission line 110 is advanced through the conduit C.

The control unit 120 operates as the primary user interface with the installation technician. The control unit 120 prompts the user, such as the installation technician or other user, to provide inputs to control the overall operation of the transmission line conveying system 104, such as start or stop inputs, and to define an installation plan including settings for the system 104. In some embodiments, the control unit 120 includes both a local communication device as well as a network communication device such as a cellular modem or Wi-Fi communication device. The local communication device can be either a wired or wireless communication system, such as a wired serial communication device (such as a universal serial bus ("USB") device), or a wireless device (such as utilizing Wi-Fi or BLUETOOTH communication), which allows the control unit 120 to communicate with the components 340 and their local controllers 160. The network communication device enables the control unit 120 of the transmission line conveying system 104 to communicate across the Internet or other network, such as with one or more of the route evaluation system 330, the remote control and diagnostics system 332, and the installation monitoring and management system 334.

The local controllers 160 can communicate with the control unit 120 and/or other local controllers 160. The local controllers 160 are coupled to other sensors or controllable devices within the components 340, and therefore are capable of receiving or generating data associated with the components 340 and are also able to control any controllable devices such as motors, pumps, and the like.

The communications can be used to transmit control commands or data. Control commands are issued by one controller 338 to another controller 338 and instruct the other controller 338 to adjust an operation, such as to speed up or slow down, start or stop, increase or decrease a pull or push force, or other controllable operations.

Data communication is used to transmit information within the system. An example of a data transmission may include a temperature, speed, pressure, humidity, tension or force, or other information. Data may be generated by a sensor or may simply identify a current status or operational parameter of one of the components (e.g., indicating that the device is turned on, or indicating that the device is currently set to operate at a particular speed, etc.). Data received from one controller 338 by another controller 338 can be used by that other controller to react accordingly, such as to adjust its own operation, or may be used by the control unit to send one or more commands to the components 340.

In some embodiments the control unit 120 and plurality of components 340 are configured to communicate with each other according to a predefined communication protocol to automatically identify each other and to make use of resources provided by the connected components 340. For example, when a first component 340 is added to the transmission line installation system 100, the first component 340 and the controller 338 communicate with each other to identify each other and determine the resources (including features and functionality) that are now available to the transmission line installation system 100 as a result. When additional components 340 are added the components 340 are similarly identified. The transmission line installation system 100 can therefore operate in such a way that it utilizes the resources available to it, and similarly can identify any problems or deficiencies in the current system configuration and make recommendations to the operator to change the configuration if needed. When an installation plan is developed, as discussed herein, the plan can be customized based on the specific configuration of the system at that time. Similarly, other parts such as the duct itself, the transmission line 110, or transmission line reel 108, and the like can also be identified by the transmission line installation system 100, such as by reading an RFID tag or communicating with a local controller 160 associated with those parts, to identify characteristics of the parts.

In some embodiments the control unit 120 and the components 340 are fully operable individually regardless of whether or not they are connected with the control unit 120 or other components 340. When connected they cooperate with each other to utilize the resources of the others, and when disconnected they operate with whatever resources are available.

In various implementations the transmission line installation system 100 can operate in various different control and communication modes. Several examples include: (1) a master/slave control model in which the control unit 120 operates as a controller 338, where the control unit 120 is the master device and the local controllers 160 operate as slave devices; (2) a controller 338 and local controller 160 model utilizing peer-to-peer communication in which the controller 338 performs an advisory role and the local controllers 160 are capable of operating independently under the advice of the controller 338; and (3) a peer-to-peer model where the local controllers 160 cooperate but independently control their own components 340, and where the control unit 120 does not attempt to control the individual operations of the components 340, but rather performs the role of a primary interface with the installation technician, to provide the local controllers 160 with instructions received from the installation technician. Other communication and control modes are also possible. As one further example, the controller 338 can be part of one of the components 340, such as the advancement device 112. In yet another example, the role of a local controller 160 as the controller 338 can be passed from one component 340 to other components 340 during the course of an installation. For example, in some embodiments an advancement device 112A local controller 160 is the global controller while the distal end of the transmission line 352 is within the conduit C segment C1 that it controls, and then the global controller status switches to the local controller 160 of the advancement device 112B once the distal end of the transmission line 352 moves into the next conduit C segment C2. This can be beneficial because the advancement device 112 associated with the current conduit C segment may have the most current information about the status of the distal end of the transmission line 352, and the other components 340 can provide support to that advancement device 112 in accordance with its instructions.

In some embodiments the controller 338 includes one or more of a processing device, a memory device, a communication device, a power supply, a display device, and an input device. The communication device can be a wired communication device or a wireless communication device. Data communication can occur through any one of a variety of standard wired or wireless data communication protocols. Examples of wired communication devices include modems, USB devices, serial and other I/O communication devices. Examples of wireless communication devices include cellular communication devices, Wi-Fi (IEEE 802.11x) communication devices, BLUETOOTH communication devices, and long range (LoRa) communication devices. The display device generates a user interface for the installation technician, such as a graphical user interface.

The input device receives inputs from the installation technician. A touchscreen display can be utilized which includes both the display device and the input device.

The installation monitoring and management system 334 permits a supervisor or other person at a remote location to monitor and manage the transmission line installation system 100, and in some embodiments multiple other transmission line installation systems 100 at other sites. In some embodiments the installation monitoring and management system 334 monitors a status of the transmission line installation system 100, such as the configuration of the system during setup, and the operation of the system 100 during a transmission line 110 installation. In some embodiments the installation monitoring and management system 334 performs fleet management functions, to assign technicians to installation teams, dispatch the teams to project sites, and monitor the progress of the installations. The management system 334 can also manage schedules, such as to display schedules for the coming days or weeks, and provide historical analysis, reporting, and heuristic data.

An example of a route evaluation system 330 that can perform the route evaluation and segment characterization is described in further detail in PCT Publication WO 2018/090043 (the '043 application), filed on Nov. 14, 2017, and in PCT Publication WO 2016/176467, filed on Apr. 28, 2016, the disclosures of which are hereby incorporated by reference in their entireties. As one example, a duct mapping device (such as the route evaluation device shown in FIG. 27 of the '043 application) is passed through the duct, and includes sensors (such as one or more of an accelerometer, gyroscope, global positioning system receiver, and the like (and may have multiple of these, such as one or more three-axis accelerometers)), which map the movement and/or position of the duct mapping device as it moves through the conduit C and/or duct. A detailed three-dimensional map of the conduit C route can then be generated, such as including a series of X, Y, and Z coordinates defining the position of the conduit C at frequent intervals along the route. The route evaluation system 330 can therefore generate a detailed route map defining the position and features of the conduit C route along the full length of the duct.

In some embodiments the duct mapping device 330 provides the route geometry including, for example, the degrees of bends, the radius of the bends, the cumulative amount of bends, whether a minimum bend radius of the cable is exceeded, and X, Y & Z GPS coordinates of the duct taken at certain intervals, such as at a sampling rate of 100 Hz intervals.

Other examples of duct mapping devices 330 that can be utilized for route evaluation and segment characterization are the mapping tools available from Reduct NV, of Schelle, Belgium, including the ABM-30 gyro mapping tool, ABM-40 MEMS based mapping probe, the ABM-80 and ABM-90 wheeled mapping tools, the DR-2 fiber optic gyroscope mapping probe, DR-3 mapping tool, and DR-4 multi-purpose pipeline mapping system.

FIG. 13 is a schematic block diagram illustrating another example of the local controller 160 of a component 340 of the transmission line installation system 100.

The same or similar local controller 160 can be used with any of the components 340 of the transmission line installation system 100. Examples of the components 340 that can include the local controller 160 include power sources, advancement devices 112 (or other transmission line conveying apparatus), an air heater, an air cooler, an air humidifier, an air dryer, a static charge elimination device, a moisturizer, and a lubricator. Other components of the transmission line installation system 100 may also include a local controller 160 if data communication, synchronization, or control of the component 340 is desired. In some embodiments the control unit 120 can include a local controller 160, for example, in some embodiments the control unit 120 is integrated with another component 340, such as the advancement device 112.

The local controller 160 controls the overall operation of the component 340, and communicates through the communication device 364 with one or more other components 340 of the transmission line installation system 100. For example, in some embodiments the local controller 160 receives commands in the form of messages or instructions from the control unit 120 through the communication device 364. Examples of such commands include start, stop, and speed adjustments (a particular speed setting, an instruction to increase the speed, or an instruction to decrease the speed, etc.). Further, in some embodiments the local controller 160 also sends messages or instructions to other components 340 through the communication device 364. For example, measured data or current or historical settings can be transmitted by the local controller 160 to other components.

The processing device 360 operates to process data instructions to perform functions of the component 340. The memory device 362 stores data instructions, which when executed by the processing device 360, cause the processing device 360 to perform those functions. The memory device 362 does not include transitory media carrying data signals. An example of the memory device 362 is a non-transitory computer readable storage device as described in further detail herein.

The communication device 364 is a device that communicates with other devices via wired or wireless data communication. In some embodiments the communication device 364 communicates with one or more of the control units 120 and other components 340 of the transmission line installation system 100.

The communication device 364 can utilize wireless or wired communication devices. Examples of wireless communication devices include cellular communication devices, Wi-Fi (IEEE 802.11x) communication devices, and BLUETOOTH communication devices. Wired communication devices include modems, USB devices, serial and other I/O communication devices and techniques.

The intracomponent input/output communication device 366 operates to communicate with and control subsystems, sensors, or other electronic or controllable devices within the component 340, utilizing wired or wireless communication or control signals. For example, the intracomponent input/output communication device 366 is coupled to and controls mechanical, pneumatic, or electronic components such as motors, brakes, sensors (e.g., temperature, moisture, transmission line tension, speed, line counter, etc.).

Examples of processing devices 360, memory devices (including computer readable storage devices) 362, and communication devices 364 are described herein with reference to an example computing device 370, and also with reference to the local controllers 160, and such descriptions similarly apply to the processing device 360, memory device 362, and communication device 364 of the example local controller 160 shown in FIG. 6.

Figure 14:
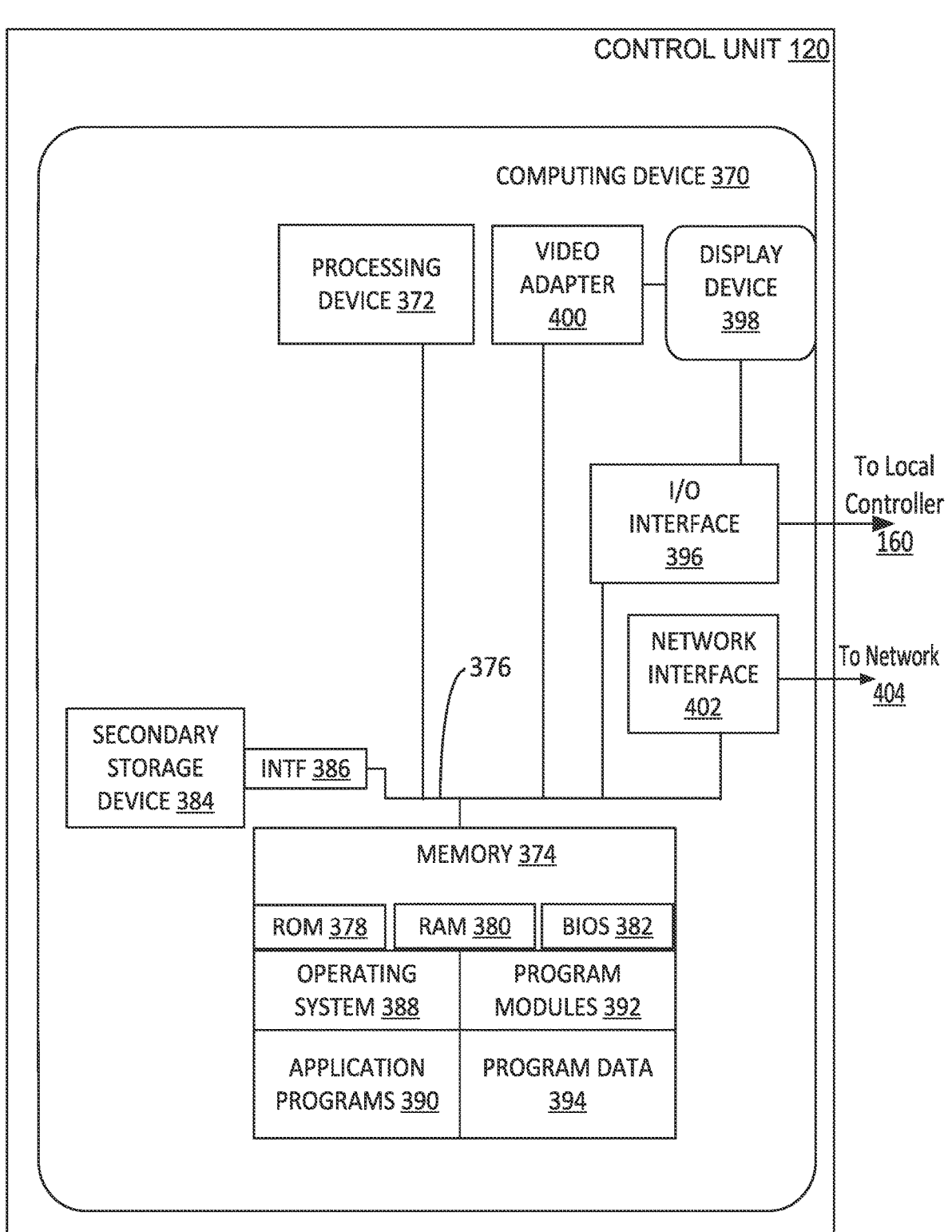
FIG. 14 is a schematic block diagram illustrating another example of the local controller of a component of the transmission line installation system illustrated and described in FIGS. 1-6.

FIG. 14 is a schematic block diagram illustrating another example of the control unit 120 of the transmission line installation system shown 100 in FIG. 1. FIG. 14 is an example of a local controller 160 or a control unit 120. This figure illustrates an exemplary architecture of a computing device 370 that can be used to implement aspects of the present disclosure, including any of the plurality of the computing devices 370 described herein, including the control unit 120, controller 338, and any other computing device 370 involved in the transmission line installation system 100.

Further, the computing device 370 can also be implemented as part of any one or more of the transmission line installation system components 340 discussed herein, such as a portion of the reel stand 106, the transmission line conveying system 104 (including the power source 116, and/or the advancement device 112). The computing device 370 can be used to execute the operating system, application programs, and software modules (including the software engines) described herein. By way of example, the computing device 370 will be described below as an example of the control unit 120. To avoid undue repetition, this description of the computing device 370 will not be separately repeated herein for each of the other computing devices, including those listed above, but such devices can also be configured as illustrated and described with reference to FIG. 14.

In this example, the control unit 120 includes a computing device 370. The computing device 370 can be used to execute the operating system, application programs, methods, and software modules, and to perform any one or more of the functions of the control unit 120, described herein.

The computing device 370 includes, in some embodiments, at least one processing device 372, such as a central processing unit (CPU). A variety of processing devices are available from a variety of manufacturers, for example, Intel or Advanced Micro Devices. In this example, the computing device 370 also includes a system memory 374, and a system bus 376 that couples various system components including the system memory 374 to the processing device 372. The system bus 376 is one of any number of types of bus structures including a memory bus, or memory controller; a peripheral bus; and a local bus using any of a variety of bus architectures. Examples of computing devices suitable for the computing device 370 include a server computer, a desktop computer, a laptop computer, a tablet computer, a mobile computing device (such as a smart phone, an iPod® or iPad® mobile digital device, or other mobile devices), or other devices configured to process digital instructions.

The system memory 374 includes read only memory ("ROM") 378 and random-access memory ("RAM") 380. A basic input/output system ("BIOS") 382 containing the basic routines that act to transfer information within computing device 370, such as during start up, is typically stored in the read only memory 378. The computing device 370 also includes a secondary storage device 384 in some embodiments, such as a hard disk drive, for storing digital data. The secondary storage device 384 is connected to the system bus 376 by a secondary storage interface ("INTF") 386. The secondary storage devices 384 and their associated computer readable media provide nonvolatile storage of computer readable instructions (including application programs and program modules), data structures, and other data for the computing device 370.

Although the exemplary environment described herein employs a hard disk drive as a secondary storage device, other types of computer readable storage media are used in other embodiments. Examples of these other types of computer readable storage media include magnetic cassettes, flash memory cards, digital video disks, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 384 or system memory 374, including an operating system 388, one or more application programs 390, other program modules 392 (such as the software engines described herein), and program data 394. The computing device 370 can utilize any suitable operating system, such as Microsoft Windows™, Google Chrome™, Google Android, Apple OS, Apple iOS, Linux, and any other operating system suitable for a computing device.

In some embodiments, a user provides inputs to the computing device 370 through one or more input devices, such as the display device 398. Other input devices can also be used, such as a keyboard, mouse, pointer control device (such as a touch pad, touch stick, joystick, etc.), microphone, and any other suitable input device. The input devices are often connected to the processing device 372 through an input/output interface ("I/O") 396 that is coupled to the system bus 376. Wireless communication between input devices and the I/O interface 396 is possible as well, and includes infrared, BLUETOOTH® wireless technology, IEEE 802.11x Wi-Fi technology, cellular, or other radio frequency communication systems. Therefore, in some embodiments the I/O interface is a wireless communication device.

One or more input/output interfaces 396 can be used for communicating with other components of the transmission line installation system 100, such as the transmission line source 102, and transmission line conveying system 104. The input/output interface 396 can include AC, DC, or digital input output interfaces, including for example USB and other I/O interfaces, and can also or alternatively include one or more communication devices such as a wireless communication device, wired network communication device (e.g., a modem or Ethernet communication device), or other wired communication devices (e.g., serial bus). The I/O interface 396 can communicate with the local controllers 160 of other components 340 of the transmission line installation system 100. In some embodiments the communication includes communication of data and commands. Examples of data include sensor data, such as a temperature, humidity, transmission line length, transmission line speed, reel feed speed, and other data describing current operating conditions. Examples of commands include start, stop, setting adjustments, and the like.

In this example embodiment, a display device 398, such as a monitor, liquid crystal display device, projector, or touch sensitive display device, is also connected to the system bus 376 via an interface, such as a video adapter 400. In addition to the display device 398, the computing device 370 can include various other peripheral devices (not shown), such as a wireless headset, speakers, and a printer.

When used in a local area networking environment or a wide area networking environment (such as the Internet), the computing device 370 is typically connected to a network 404 through a network interface 402, such as an Ethernet interface, or by a wireless communication device, such as using cellular or Wi-Fi communication. In some embodiments the network interface 402 is a cellular modem that can access the Internet through a cellular network. The network interface 402 can communicate with remote systems, such as a route evaluation system 330.

The computing device 370 typically includes at least some form of computer readable media. Computer readable media includes any available media that can be accessed by the computing device 370. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 370. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In some embodiments the computing device 370 includes or is connected to a location determining device, such as a global positioning system (GPS) receiver.

Figure 15:
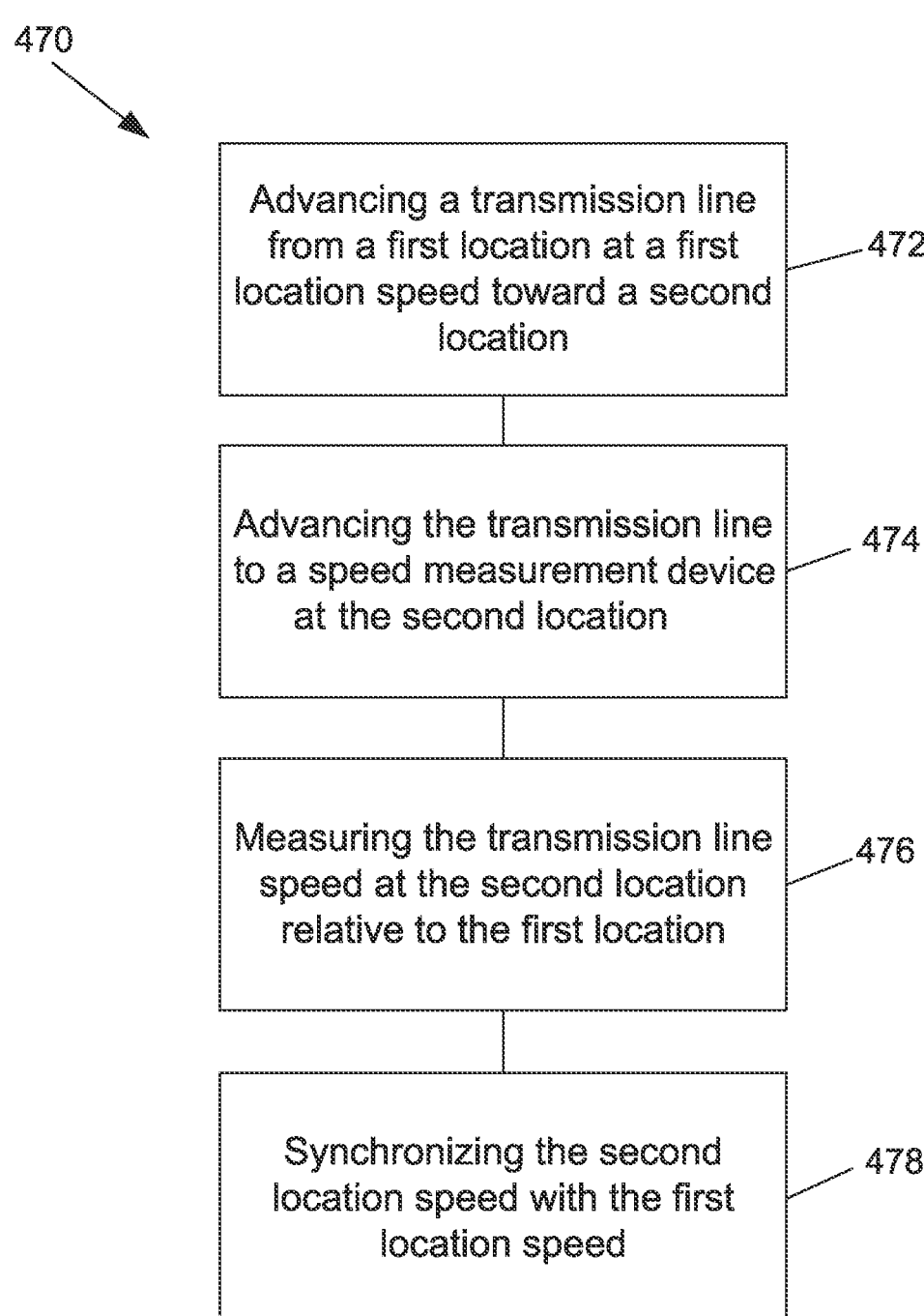
FIG. 15 is a flow chart illustrating a method for adjusting the speed of a transmission line at an advancement device to an optimal speed using a speed measurement device.

FIG. 15 is a flow chart illustrating a method 470 for adjusting the speed of a transmission line 110 at an advancement device 112 to an optimal speed using a speed measurement device 220.

In a first operation 472 the transmission line 110 is advanced from a first location at a first location speed toward a second location within the transmission line installation system 100. The first location can include an initial advancement device 122 or a downstream subsequent advancement device 124. In some embodiments, the first location can include a transmission line source 102, wherein the initial advancement device 122 advances a transmission line 110 from the transmission line source 102 to the second location. The second location includes a subsequent downstream advancement device 124 that is downstream of the advancement device 112 located at the first location in the transmission line installation system 100. In some embodiments, the advancement device 112 at the first location advances the transmission line 110 to the second location through a conduit C. In some embodiments, the first location includes a cascade junction 270 configured to receive the transmission line 110 and advance the transmission line 110 further downstream within the transmission line installation system 100. In a particular embodiment a cascade junction 270 may be installed at an access point 118. In some embodiments, the cascade junction 270 includes a transmission line advancement device 112 as well as, for example, two (or more) conduits C connected to the transmission line advancement device 112. For example, the cascade junction 270 can include incoming conduit segment 240 and outgoing conduit segment 242. The cascade junction 270 is illustrated and described herein in further detail with respect to FIG. 18.

In a second operation 474 the transmission line 110 is advanced to a speed measurement device 220 at the second location. The speed measurement device 220 is coupled to the subsequent advancement device 124 located at the second location. The speed measurement device 220 is configured to receive the transmission line 110 from the first location, measure the speed of the transmission line 110 at the second location relative to the first location, and allow the transmission line 110 to pass through the speed measurement device 220 to be received by the subsequent advancement device 124 at the second location. The speed measurement device 220 is illustrated and described herein in further detail with respect to FIGS. 5-6 and 9-11.

In a third operation 476 the speed of the transmission line 110 at the second location is measured relative to the speed of the transmission line 110 at the first location by the speed measurement device 220. In some embodiments, the speed measurement device 220 includes a slide block configured to slide a slide distance S relative to an inlet 184 of the subsequent advancement device 124 at the second location. In embodiments, a speed measurement device sensor 216 may be used to measure the slide distance S to interpret the speed of the transmission line 110 at the first location relative to the speed of the transmission line 110 at the second location. In some embodiments, a user may observe the slide distance S relative to an optimal position tolerance 217 to interpret the speed of the transmission line 110 at the first location relative to the speed of the transmission line 110 at the second location. The speed measurement device 220 and speed measurement device sensor 216 are illustrated and described herein in further detail with respect to FIGS. 5-6 and 9-11.

In a fourth operation 478 the speed of the transmission line 110 at the second location may be synchronized to the speed of the transmission line 110 at the first location.

In some embodiments, the speed of the transmission line 110 at the second location is manually synchronized to the speed of the transmission line 110 at the first location. This can be done using a speed measurement device 220 that includes position markings 217, 218, 219 to indicate whether the slide distance S of a speed measurement device is within an optimal position tolerance 217. As discussed in FIGS. 9-11, a user may manually synchronize the speed of the transmission line 110 at the second location by reading the position markings 217, 218, 219 and adjusting the speed of the tractor drives 154, 156 within an advancement device 112 at the first location or the second location. In some embodiments, the tractor drives 154, 156 are adjusted in the subsequent advancement device 124 at the second location.

In some embodiments, the speed of the transmission line 110 at the second location may be automatically synchronized with the speed of the transmission line 110 at the first location. The speed measurement device 220 may optionally include a speed measurement device sensor 216 for manually measuring the position of the speed measurement device 220, wherein the position of the speed measurement device 220 corresponds to a speed of the transmission line 110 at the second location relative to the first location. In some embodiments, a plurality of speed measurement device sensors 216 may be used to measure the location of the speed measurement device 220. The speed measurement device 220 is configured to communicate with a local controller 160 within the subsequent advancement device 124 to automatically adjust the speed of the tractor drives 154, 156 until the transmission line 110 is advanced at a synchronized speed between the first and second location.

Furthermore, the method 470 for advancing a transmission line 110 from one location to another at a synchronized speed may be repeated for any number of downstream subsequent advancement devices 124 within the transmission line installation system 100.

Figure 16:
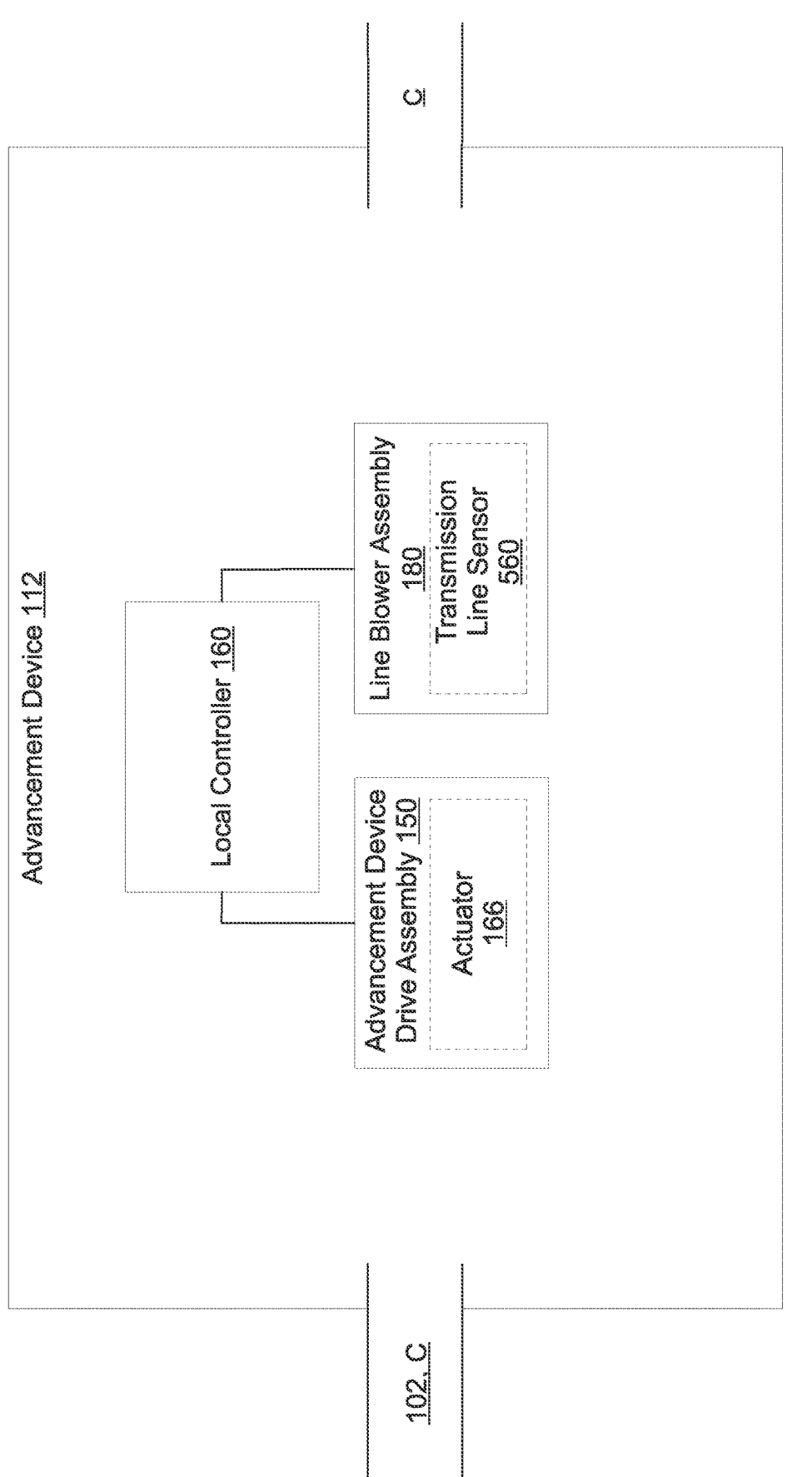
FIG. 16 is a block diagram of an advancement device illustrating the components of FIG. 5 and optional components including an actuator and transmission line sensor.

FIG. 16 is a block diagram of an advancement device 112 illustrating the components of FIG. 5 and optional components including an actuator 166 and a transmission line sensor 560.

The transmission line sensor 560 is positioned within the line blower assembly 180 of the advancement device 112. The positioning of the transmission line sensor 560 is downstream of the actuator 166 to ensure the actuator 166 does not apply a clamping force to the transmission line 110 until the transmission line 110 enters the advancement device drive assembly 150. In some embodiments, the actuator 166 is a clamp cylinder. In some embodiments, the transmission line sensor 560 is an optical detector (not shown) that reads markings (not shown) on the exterior of the transmission line 110. The transmission line sensor 560 communicates the presence of a transmission line 110 within the line blower assembly 180 to a local controller 160 for communication to other components 340 or the control unit 120. The local controller 160 may then communicate with the actuator 166 within the advancement device drive assembly 150 to position the tractor drive assembly 152 to frictionally engage with the transmission line 110 to advance the transmission line 110. The actuator 166 may apply a preset clamping force that is less than a maximum transmission line compression force to minimize damage to the transmission line 110.

In some embodiments, the transmission line sensor 560 communicates with the local controller 160 to automatically instruct the actuator 166 to apply a clamping force to the transmission line 110. In some embodiments, the automatic operation of the actuator 166 within the advancement device drive assembly 150 may be hydraulically, electrically, or pneumatically driven. In some embodiments, the actuator 166 may include a manual valve for a user to manually adjust the actuator and apply a clamping force to the transmission line 110.

FIG. 17 is a side view of the advancement device 112 illustrating the components of FIG. 16. As a transmission line 110 enters the advancement device 112 at a transmission line entrance 700 (as shown in the figure), the transmission line 110 passes through the advancement device drive assembly 150 and actuator 166 moving in direction D. The transmission line 110 then enters the line blower assembly 180 where it is sensed by the transmission line sensor 560. The transmission line sensor 560 then communicates to a local controller 160 that a transmission line 110 is present within the line blower assembly 180. The local controller 160 then communicates with the actuator 166 to apply a preset clamp pressure to the transmission line 110 within the advancement device drive assembly 150 to control the speed of the transmission line 110 as it is advanced by the advancement device 112. In embodiments, the transmission line 110 may also pass through multiple air blocks 802A, 802B. The transmission line 110 may exit the advancement device 112 at the transmission line exit 702 moving in direction D.

Figure 18:
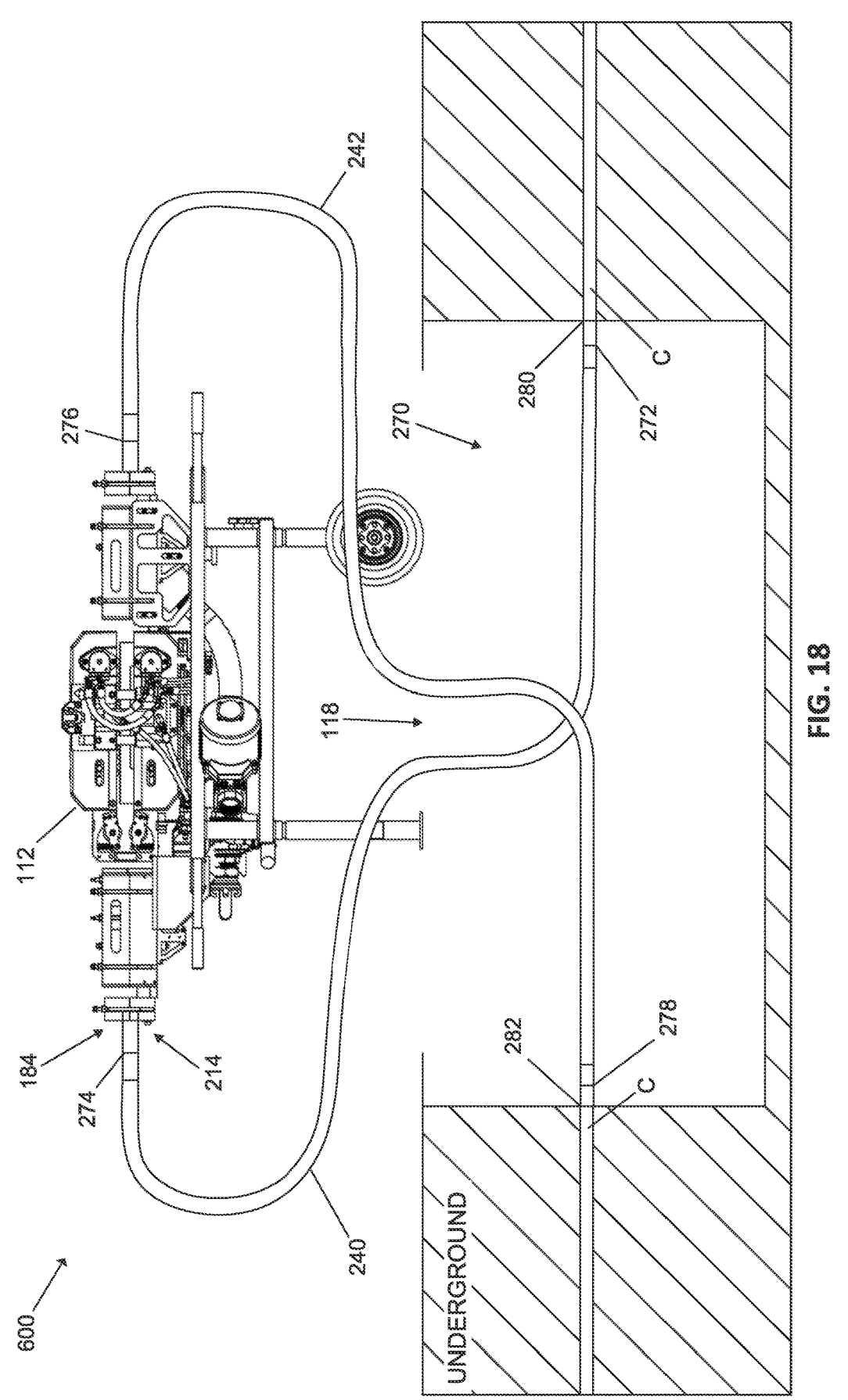
FIG. 18 is a side view of an example transmission line speed adjustment system with an advancement device at a cascade junction, including various components for advancing a transmission line through the cascade junction.

FIG. 18 is a side view of the example subsequent advancement device 124 as shown in FIGS. 5-6 further illustrating various components for transporting a transmission line 110 through a conduit C at an access point 118 within a cascade junction 270. The cascade junction 270 includes a conduit having a conduit upstream end 280 and a conduit downstream end 282, a conduit-incoming conduit segment connector 272, an incoming conduit segment 240, an incoming conduit segment-advancement device connector 274, an advancement device 112, an advancement device-outgoing conduit segment connector 276, an outgoing conduit segment 242, and an outgoing conduit segment-conduit connector 278, wherein each component of the cascade junction 270 is positioned at an access point 118. In certain embodiments, the conduit upstream end 280 and the conduit downstream end 282 may align in three-dimensional space such that a direction of travel of the transmission line 110 through the conduit C from the conduit upstream end 280 to a conduit downstream end 282 only occurs in one dimension.

The conduit-incoming conduit segment connector 272 is configured to couple the incoming conduit segment 240 to the conduit C at a conduit upstream end 280 and guide the transmission line 110 from the conduit C to the incoming conduit segment 240.

The incoming conduit segment 240 is configured to guide the transmission line 110 to an incoming conduit segment-advancement device connector 274.

The incoming conduit segment-advancement device connector 274 is configured to couple the incoming conduit segment 240 to the advancement device 112 and guide the transmission line 110 from the incoming conduit segment 240 into the advancement device 112 at the inlet 184, (or in some embodiments, to the speed measurement device 220, such as shown in FIG. 9) which includes a lead-in guide 214.

The advancement device-outgoing conduit segment connector 276 is configured to couple the advancement device 112 to the outgoing conduit segment 242 and guide the transmission line 110 from the advancement device 112 to the outgoing conduit segment 242.

The outgoing conduit segment 242 is configured to guide the transmission line 110 to the outgoing conduit segment-conduit connector 278.

The outgoing conduit segment-conduit connector 278 is configured to guide the transmission line from the outgoing conduit segment 242 to the conduit C at a conduit downstream end 282.

Figure 19:
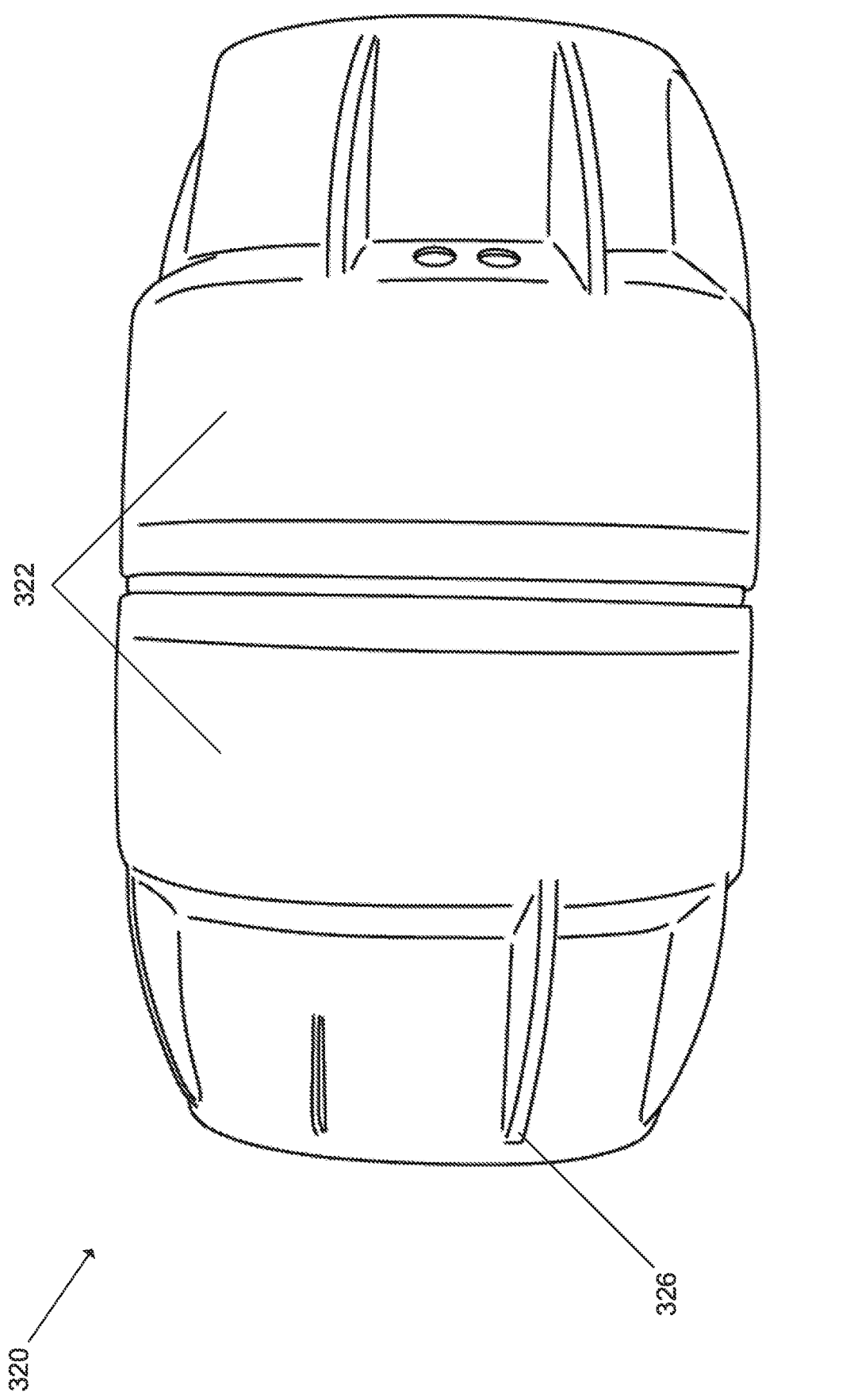
FIG. 19 is an example connector that is configured to be used within the cascade junction of FIG. 18.

FIG. 19 is a side perspective view of an example connector 320 that is configured to couple to the incoming conduit segment 240, the outgoing conduit segment 242, to the advancement device 112, or a conduit C. In some embodiments, the connector 320 may be used within a cascade junction 270 as a conduit-incoming conduit segment connector 272, an incoming conduit segment-advancement device connector 274, an advancement device-outgoing conduit segment connector 276, or an outgoing conduit segment-conduit connector 278 as illustrated and described in FIGS. 7-13.

In some embodiments, the connector 320 includes two end nuts 322 that couple to a central segment. In some embodiments, the end nuts 322 include threads 324 that couple to the central segment using a threaded connection. Furthermore, in some embodiments, the connector 320 includes a grip ring coupled to an end nut 322 that is configured to fit around a conduit C or other object. In some embodiments, the grip ring fits around a conduit C or other object using an interference fit. In some embodiments, the connector 320 includes a hermetic seal, such as an O-ring. In some embodiments, the connector 320 is composed of a plastic material such as high-density polyethylene (HDPE). A plastic material, such as HDPE, is desirable because it is resistant to corrosion while having desirable insulative properties. In some embodiments, the connector 320 includes a tapered design with ridges 326 to allow a user to twist the end nuts 322 without tools. In some embodiments, the connector 320 includes a compact design that is configured to be used within limited-access areas such as access points 118. These access points 118 may include pull boxes, vaults, narrow trenches, or other underground spaces.

Figure 20:
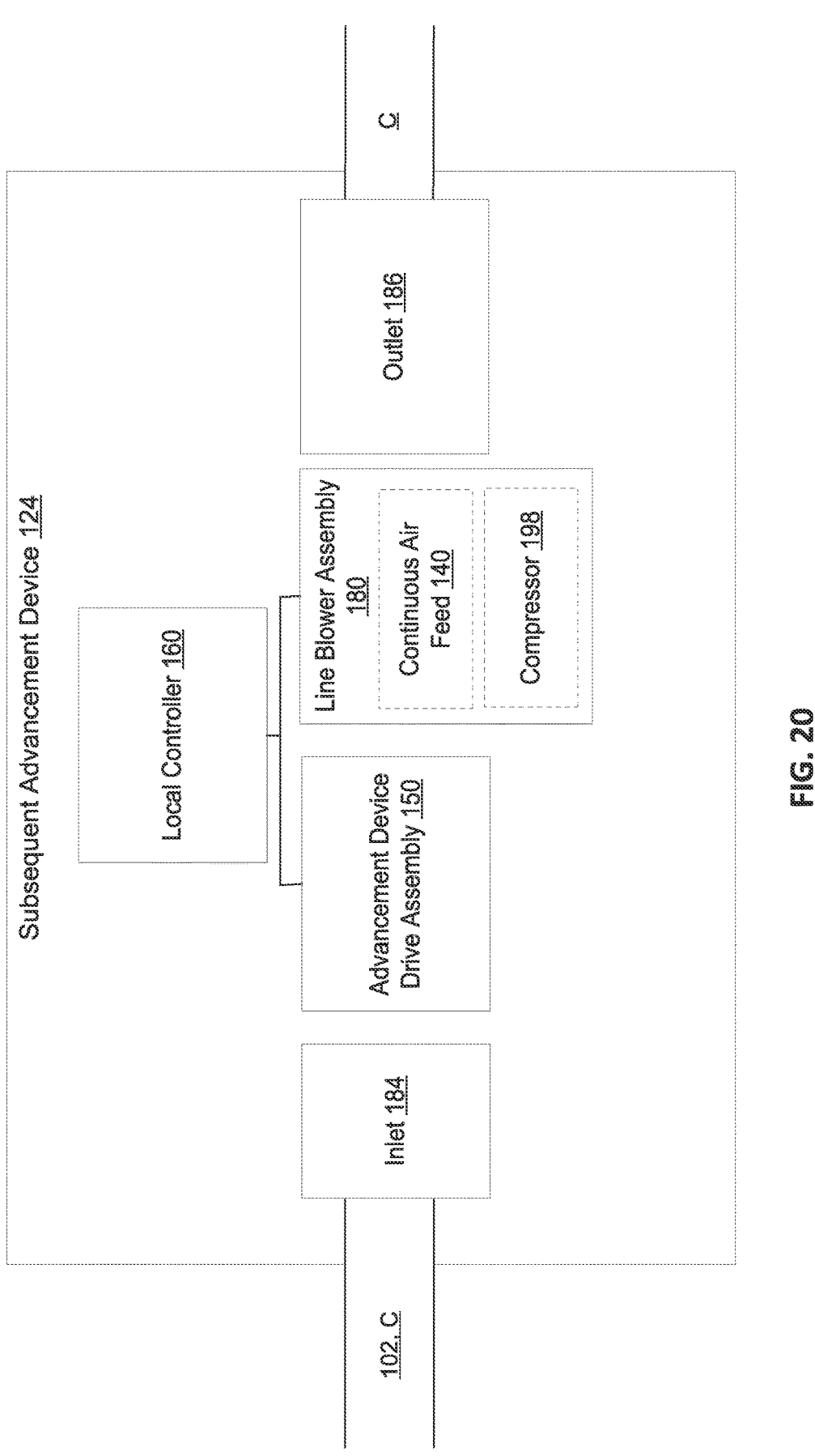
FIG. 20 is a block diagram of an advancement device illustrating the components of FIG. 4 and optional components including a continuous air feed and a pressurized fluid source.

FIG. 20 is a block diagram of a subsequent advancement device 124 illustrating the components of FIG. 5 and optional components including a continuous air feed 140 and a compressor 198.

In some embodiments, the continuous air feed 140 is included within the line blower assembly 180. The continuous air feed 140 is located downstream of an inlet 184. When the advancement device 112 receives a transmission line 110 at the inlet 184, the transmission line 110 is advanced into the advancement device drive assembly 150. A seal (not shown) is placed within the inlet 184 that allows the transmission line 110 to pass into the advancement device drive assembly 150 while deflecting pressurized fluid from a previous advancement device 112 within a transmission line installation system 100 to the continuous air feed 140. If a force from the pressurized fluid from a previous advancement device 112 is insufficient to continue advancing the transmission line 110 along the transmission line installation system 100, then an additional force from a compressor 198 may be introduced at the continuous air feed 140 to continuously advance the transmission line 110 within the transmission line installation system 100. In some embodiments, a sensor (not shown) may be used to automatically measure the pressure at the continuous air feed 140 and communicate that pressure to the local controller 160, wherein the local controller 160 then engages the compressor 198 to release pressurized fluid into the continuous air feed 140. In some embodiments, a user may manually release pressurized fluid from the compressor 198 into the continuous air feed 140 if a pressure sensor indicates a pressure that is insufficient to advance the transmission line 110 within the transmission line installation system 100.

Figure 21:
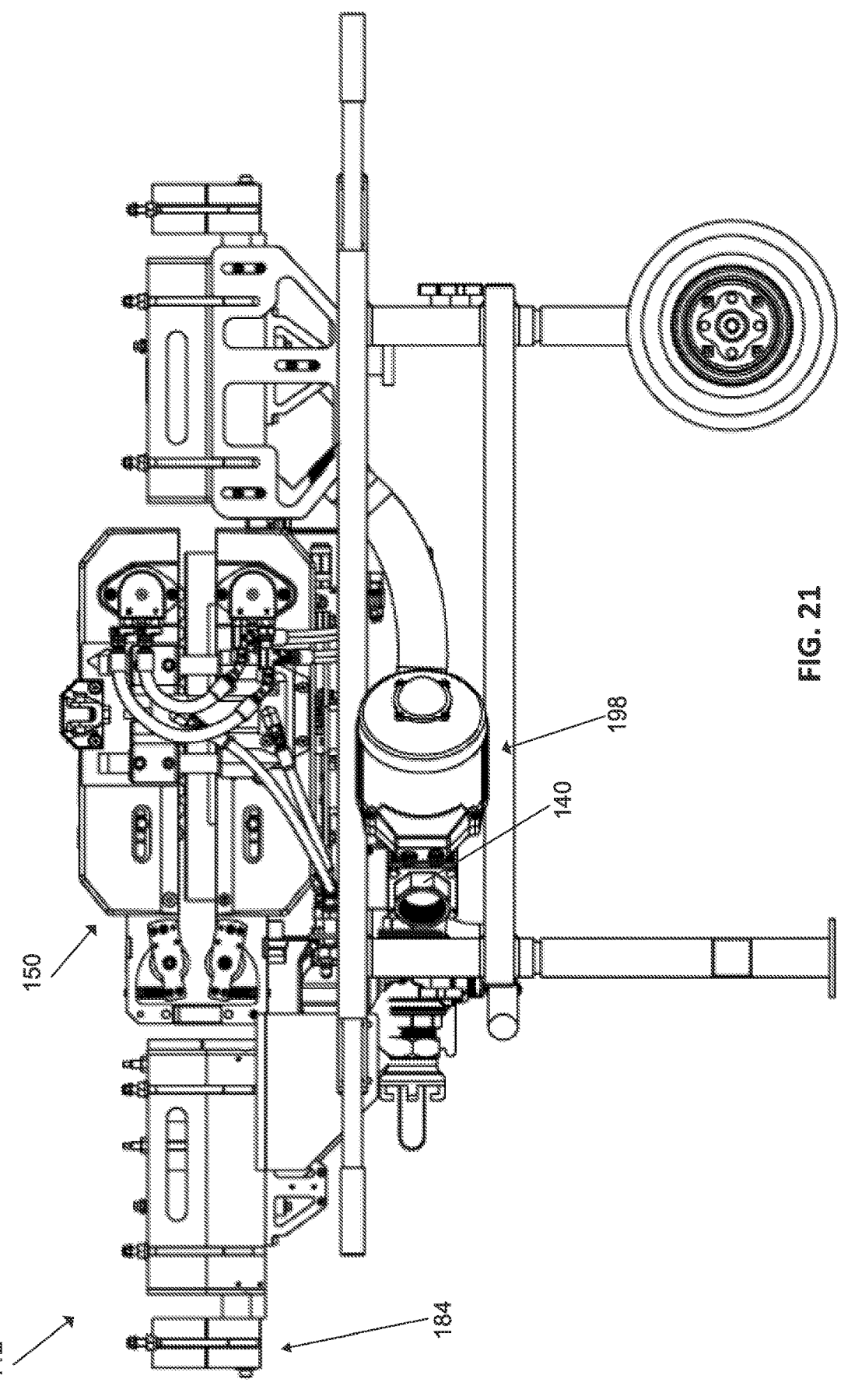
FIG. 21 is a side view illustrating the components of FIG. 20, including the continuous air feed and pressurized fluid source.

FIG. 21 is a side view illustrating the components of FIG. 20, including the continuous air feed 140 and compressor 198.

In some embodiments, the continuous air feed 140 and compressor 198 are included within the advancement device 112 at a cascade junction 270. The continuous air feed 140 and compressor 198 may apply an additional force within the line blower assembly 180 as illustrated and described in FIG. 20.

One or more features from any embodiment may be combined with one or more features of any other embodiment without departing from the scope of the invention.

What is claimed is:

1. A transmission line speed adjustment system for synchronizing a first location speed and a second location speed comprising:

a conduit configured to receive a transmission line from a first location at the first location speed and guide the transmission line to a speed measurement device coupled to the conduit;

an advancement device configured to receive the transmission line from the speed measurement device and apply an advancement force to the transmission line to advance the transmission line at the second location speed;

the speed measurement device configured to slide relative to the advancement device when the first location speed is not equal to the second location speed; and a speed measurement device sensor configured to indicate a position of the speed measurement device and a corresponding speed of the transmission line at a second location relative to the first location.

2. The transmission line speed adjustment system of claim 1, wherein the speed measurement device sensor provides instruction to adjust the advancement force to synchronize the second location speed with the first location speed.

3. The transmission line speed adjustment system of claim 1, further comprising position markings along the speed measurement device sensor for visually indicating the position of the speed measurement device.

4. The transmission line speed adjustment system of claim 3, wherein the position markings are configured to indicate the position of the speed measurement device relative to the advancement device.

5. The transmission line speed adjustment system of claim 4, wherein the position markings are configured to indicate the position of the speed measurement device relative to an optimal position.

6. The transmission line speed adjustment system of claim 5, further comprising an optimal position tolerance, wherein the position markings are configured to indicate the position of the speed measurement device relative to the optimal position tolerance.

7. The transmission line speed adjustment system of claim 1, further comprising a manual actuator configured to manually adjust the second location speed.

8. The transmission line speed adjustment system of claim 1, further comprising a local controller configured to control various components of the advancement device.

9. The transmission line speed adjustment system of claim 8, wherein the speed measurement device sensor is configured to communicate the position of the speed measurement device to the local controller configured to control various components of the advancement device.

10. The transmission line speed adjustment system of claim 9, wherein the local controller is configured to receive an instruction from the speed measurement device sensor and transmit the instruction to the advancement device to adjust the advancement force to synchronize the second location speed with the first location speed.

11. The transmission line speed adjustment system of claim 10, wherein the instruction provided by the speed measurement device sensor includes the position of the speed measurement device relative to an optimal position tolerance.

12. The transmission line speed adjustment system of claim 1, wherein the speed measurement device sensor is selected from a group consisting of a linear position sensor, a rotary position sensor, an angular position sensor, an inductive position sensor, an ultrasonic position sensor, a magnetostrictive position sensor, a capacitive position sensor, an optical sensor, a potentiometer, or a fiber-optic position sensor.

13. A method for synchronizing a transmission line first location speed with a transmission line second location speed comprising:

using a conduit, receiving a transmission line from a first location and guiding the transmission line at a first location speed to a speed measurement device;

using the speed measurement device, receiving the transmission line from the conduit at a speed measurement device first end and guiding the transmission line to an advancement device coupled to a speed measurement device second end, wherein the speed measurement device is configured to measure a first location force at the speed measurement device first end and a second location force at the speed measurement device second end;

using the speed measurement device, comparing the first location force and the second location force; and using the advancement device, adjusting the transmission line second location speed until the speed measurement device indicates that a difference between the first location force and the second location force are within an optimal position tolerance.

14. The method for synchronizing a speed of a transmission line of claim 13, wherein the speed measurement device further comprises a slide block configured to slide relative to the advancement device when the first location force and the second location force are unequal, wherein using the speed measurement device further comprises comparing the first location force and the second location force by measuring a slide block distance relative to the advancement device.

15. The method for synchronizing the speed of a transmission line of claim 14, further comprising a speed measurement device sensor that includes visual markings for indicating a position of the slide block relative to the advancement device, wherein measuring the position of the slide block relative to the advancement device includes observing the position of the slide block relative to the visual markings.

16. The method for synchronizing the speed of a transmission line of claim 15, further comprising manually measuring the position of the slide block by visually inspecting the visual markings of the speed measurement device sensor.

17. The method for synchronizing the speed of a transmission line of claim 16, wherein the visual markings indicate the position of the slide block relative to the optimal position tolerance, wherein comparing a measured position of the slide block to the optimal position tolerance includes observing the position of the slide block relative to optimal position.

18. The method for synchronizing the speed of a transmission line of claim 17, further comprising manually comparing the measured position of the slide block to the optimal position tolerance by visually inspecting the visual markings.

19. The method for synchronizing the speed of a transmission line of claim 17, wherein the speed measurement device sensor further comprises a position sensor, wherein the position of the slide block relative to the advancement device is measured using the position sensor.

20. The method for synchronizing the speed of a transmission line of claim 19, further comprising using the position sensor to communicate the position of the slide block relative to the advancement device to a local controller configured to control various components of the advancement device.

* * * * *